US008841495B2

(12) United States Patent
Marker et al.

(10) Patent No.: US 8,841,495 B2
(45) Date of Patent: Sep. 23, 2014

(54) BUBBLING BED CATALYTIC HYDROPYROLYSIS PROCESS UTILIZING LARGER CATALYST PARTICLES AND SMALLER BIOMASS PARTICLES FEATURING AN ANTI-SLUGGING REACTOR

(75) Inventors: Terry L. Marker, Palos Heights, IL (US); Larry G. Felix, Pelham, AL (US); Martin B. Linck, Oak Park (IL); Michael J. Roberts, Itasca, IL (US)

(73) Assignee: Gas Technology Institute, Des Plaines, IL (US)

( * ) Notice: Subject to any disclaimer, the term of this patent is extended or adjusted under 35 U.S.C. 154(b) by 827 days.

(21) Appl. No.: 13/089,010

(22) Filed: Apr. 18, 2011

(65) Prior Publication Data

US 2012/0260563 A1    Oct. 18, 2012

(51) Int. Cl.
*C10B 53/02* (2006.01)
*C10B 57/18* (2006.01)
*C10G 1/08* (2006.01)
*C10G 1/10* (2006.01)
*B01J 8/18* (2006.01)
*B01J 8/34* (2006.01)
*C10G 3/00* (2006.01)
*C10G 1/06* (2006.01)
*C10L 1/04* (2006.01)
*B01J 23/882* (2006.01)
*B01J 23/755* (2006.01)

(52) U.S. Cl.
CPC ......... *C10G 1/10* (2013.01); *B01J 2208/00548* (2013.01); *C10G 2300/1018* (2013.01); *B01J 2208/00061* (2013.01); *B01J 8/1809* (2013.01); *B01J 23/882* (2013.01); *B01J 8/34* (2013.01); *C10G 2400/02* (2013.01); *C10G 3/45* (2013.01); *C10G 2300/1003* (2013.01); *C10G 3/46* (2013.01); *B01J 23/755* (2013.01); *C10G 1/086* (2013.01); *C10G 3/57* (2013.01); *C10G 1/06* (2013.01); *C10G 2400/08* (2013.01); *C10G 2300/202* (2013.01); *C10G 2400/04* (2013.01); *B01J 2219/00252* (2013.01); *B01J 2208/0084* (2013.01); *C10G 3/50* (2013.01); *B01J 2208/00115* (2013.01); *C10L 1/04* (2013.01); *C10G 2300/1014* (2013.01)
USPC ................ 585/240; 201/2.5; 201/31; 201/36; 585/242

(58) Field of Classification Search
CPC ............ C10G 1/06; C10G 1/086; C10G 1/10; C10G 3/42; C10G 3/45; C10G 3/46; C10G 3/50; C10G 3/57; B01J 8/34; C10B 3/00; C10B 3/02; C10B 57/18
USPC ................. 585/240, 242; 201/2.5, 25, 31, 36; 422/139
See application file for complete search history.

(56) References Cited

U.S. PATENT DOCUMENTS 2,581,134 A   1/1952   Odell
2,893,849 A   7/1959   Krebs
(Continued)

FOREIGN PATENT DOCUMENTS

GB       2 017 745 A    10/1979
WO       WO 94/24228    10/1994
(Continued)

OTHER PUBLICATIONS

Mohan, et al., "Pyrolysis of Wood/Biomass for Bio-Oil: A Critical Review," in Energy & Fuels, 2006, vol. 20, pp. 848-889.
(Continued)

*Primary Examiner* — Jill Warden
*Assistant Examiner* — Joye L Woodward
(74) *Attorney, Agent, or Firm* — Banner & Witcoff, Ltd.

(57) ABSTRACT

This invention relates to a process for thermochemically transforming biomass or other oxygenated feedstocks into high quality liquid hydrocarbon fuels. In particular, a catalytic hydropyrolysis reactor, containing a deep bed of fluidized catalyst particles is utilized to accept particles of biomass or other oxygenated feedstocks that are significantly smaller than the particles of catalyst in the fluidized bed. The reactor features an insert or other structure disposed within the reactor vessel that inhibits slugging of the bed and thereby minimizes attrition of the catalyst. Within the bed, the biomass feedstock is converted into a vapor-phase product, containing hydrocarbon molecules and other process vapors, and an entrained solid char product, which is separated from the vapor stream after the vapor stream has been exhausted from the top of the reactor. When the product vapor stream is cooled to ambient temperatures, a significant proportion of the hydrocarbons in the product vapor stream can be recovered as a liquid stream of hydrophobic hydrocarbons, with properties consistent with those of gasoline, kerosene, and diesel fuel. Separate streams of gasoline, kerosene, and diesel fuel may also be obtained, either via selective condensation of each type of fuel, or via later distillation of the combined hydrocarbon liquid.

55 Claims, 3 Drawing Sheets

(56) References Cited

U.S. PATENT DOCUMENTS

| | | | |
|---|---|---|---|
| 3,997,423 | A | 12/1976 | Greene |
| 4,013,543 | A | 3/1977 | Greene |
| 4,166,786 | A | 9/1979 | Duraiswamy et al. |
| 4,260,473 | A | 4/1981 | Bauer |
| 4,326,944 | A | 4/1982 | Meyer et al. |
| 4,371,727 | A | 2/1983 | Gavin |
| 4,456,504 | A | 6/1984 | Spars et al. |
| 4,808,289 | A | 2/1989 | McDaniel et al. |
| 4,828,581 | A | 5/1989 | Feldmann et al. |
| 5,055,181 | A | 10/1991 | Maa et al. |
| 5,096,569 | A | 3/1992 | Maa et al. |
| 5,580,241 | A | 12/1996 | Koeberle |
| 5,605,551 | A | 2/1997 | Scott et al. |
| 5,969,201 | A | 10/1999 | Kalnes et al. |
| 6,060,631 | A | 5/2000 | James, Jr. et al. |
| 6,793,698 | B1 | 9/2004 | Sanger et al. |
| 7,288,685 | B2 | 10/2007 | Marker |
| 7,396,966 | B2 | 7/2008 | Glover et al. |
| 7,500,997 | B2 | 3/2009 | Norbeck et al. |
| 7,511,181 | B2 | 3/2009 | Petri et al. |
| 7,578,927 | B2 | 8/2009 | Marker et al. |
| 7,585,104 | B2 | 9/2009 | McGehee |
| 7,615,142 | B2 | 11/2009 | Lee et al. |
| 7,619,012 | B2 | 11/2009 | Norbeck et al. |
| 7,829,030 | B2 * | 11/2010 | Beech et al. .................. 422/139 |
| 7,888,540 | B2 | 2/2011 | Deluga et al. |
| 7,915,460 | B2 | 3/2011 | Kalnes et al. |
| 7,956,224 | B2 | 6/2011 | Elliott et al. |
| 7,960,520 | B2 | 6/2011 | McCall et al. |
| 7,968,757 | B2 | 6/2011 | Abhari et al. |
| 7,982,075 | B2 | 7/2011 | Marker et al. |
| 7,982,076 | B2 | 7/2011 | Marker et al. |
| 7,982,077 | B2 | 7/2011 | Kalnes et al. |
| 7,982,078 | B2 | 7/2011 | Brady et al. |
| 7,994,375 | B2 | 8/2011 | Marker et al. |
| 7,999,142 | B2 | 8/2011 | Kalnes et al. |
| 7,999,143 | B2 | 8/2011 | Marker et al. |
| 8,003,834 | B2 | 8/2011 | Marker et al. |
| 8,003,835 | B2 | 8/2011 | Yanik et al. |
| 8,013,195 | B2 | 9/2011 | McCall et al. |
| 8,038,869 | B2 | 10/2011 | Kalnes |
| 8,039,682 | B2 | 10/2011 | McCall et al. |
| 8,052,935 | B2 | 11/2011 | Leininger et al. |
| 8,058,492 | B2 | 11/2011 | Anumakonda et al. |
| 8,084,655 | B2 | 12/2011 | Dindi et al. |
| 8,088,187 | B2 | 1/2012 | Mohedas et al. |
| 8,100,990 | B2 | 1/2012 | Ellens et al. |
| 8,119,847 | B2 | 2/2012 | Dindi et al. |
| 2004/0045272 | A1 | 3/2004 | Miyoshi et al. |
| 2006/0147355 | A1 | 7/2006 | Beech, Jr. et al. |
| 2006/0194990 | A1 | 8/2006 | Miyoshi et al. |
| 2007/0119098 | A1 | 5/2007 | Diaz et al. |
| 2007/0254966 | A1 | 11/2007 | Eskin et al. |
| 2008/0006519 | A1 | 1/2008 | Badger |
| 2008/0053870 | A1 | 3/2008 | Marker et al. |
| 2008/0115415 | A1 | 5/2008 | Agrawal et al. |
| 2008/0230444 | A1 | 9/2008 | Iwadate et al. |
| 2009/0012339 | A1 | 1/2009 | Choi et al. |
| 2009/0077864 | A1 | 3/2009 | Marker et al. |
| 2009/0082604 | A1 | 3/2009 | Agrawal et al. |
| 2009/0084666 | A1 | 4/2009 | Agrawal et al. |
| 2009/0126274 | A1 | 5/2009 | Vogel et al. |
| 2009/0158637 | A1 | 6/2009 | McCall et al. |
| 2009/0165378 | A1 | 7/2009 | Agblevor |
| 2009/0227823 | A1 | 9/2009 | Huber et al. |
| 2009/0253948 | A1 | 10/2009 | McCall et al. |
| 2009/0300971 | A1 | 12/2009 | Abhari et al. |
| 2009/0318737 | A1 | 12/2009 | Luebke |
| 2009/0326285 | A1 | 12/2009 | Bauer et al. |
| 2010/0076238 | A1 | 3/2010 | Brandvold et al. |
| 2010/0087687 | A1 | 4/2010 | Medoff |
| 2010/0133144 | A1 | 6/2010 | Kokayeff et al. |
| 2010/0137662 | A1 | 6/2010 | Sechrist et al. |
| 2010/0174129 | A1 | 7/2010 | Bauman et al. |
| 2010/0228062 | A1 | 9/2010 | Babicki et al. |
| 2010/0251600 | A1 | 10/2010 | Marker et al. |
| 2010/0251615 | A1 | 10/2010 | Marker et al. |
| 2010/0256428 | A1 | 10/2010 | Marker et al. |
| 2010/0292517 | A1 | 11/2010 | Debuisschert et al. |
| 2010/0317907 | A1 | 12/2010 | Bauman et al. |
| 2010/0320121 | A1 | 12/2010 | Bauman et al. |
| 2011/0005976 | A1 | 1/2011 | Rispoli et al. |
| 2011/0054230 | A1 | 3/2011 | Cole et al. |
| 2011/0067306 | A1 | 3/2011 | Balmas et al. |
| 2011/0094148 | A1 | 4/2011 | Weiss et al. |
| 2011/0105812 | A1 | 5/2011 | Marker et al. |
| 2011/0119994 | A1 | 5/2011 | Hogendoorn et al. |
| 2011/0120138 | A1 | 5/2011 | Gaiffi et al. |
| 2011/0120909 | A1 | 5/2011 | Brandvold |
| 2011/0152513 | A1 | 6/2011 | Yao et al. |
| 2011/0154721 | A1 | 6/2011 | Chheda et al. |
| 2011/0160505 | A1 | 6/2011 | McCall |
| 2011/0167713 | A1 | 7/2011 | Quignard et al. |
| 2011/0201854 | A1 | 8/2011 | Kocal et al. |
| 2011/0201855 | A1 | 8/2011 | Marinangeli et al. |
| 2011/0232166 | A1 | 9/2011 | Kocal |
| 2011/0239530 | A1 | 10/2011 | Marinangeli et al. |
| 2011/0240522 | A1 | 10/2011 | Stine |
| 2011/0245551 | A1 | 10/2011 | Marker et al. |
| 2011/0245554 | A1 | 10/2011 | Huber et al. |
| 2011/0282115 | A1 | 11/2011 | Chheda et al. |
| 2012/0017493 | A1 | 1/2012 | Traynor et al. |
| 2012/0017494 | A1 | 1/2012 | Traynor et al. |
| 2012/0017495 | A1 | 1/2012 | Traynor et al. |
| 2012/0022171 | A1 | 1/2012 | Frey |
| 2012/0023809 | A1 | 2/2012 | Koch et al. |
| 2012/0046510 | A1 | 2/2012 | Sirdeshpande |
| 2012/0047793 | A1 | 3/2012 | Murty et al. |

FOREIGN PATENT DOCUMENTS

| | | |
|---|---|---|
| WO | WO 2007/094766 A1 | 8/2007 |
| WO | WO 2008/041992 A1 | 4/2008 |
| WO | WO 2008/080360 A1 | 7/2008 |
| WO | WO 2011/038046 A2 | 3/2011 |
| WO | WO 2011/096912 A1 | 8/2011 |
| WO | WO 2011/097548 A1 | 8/2011 |
| WO | WO 2011/103313 A2 | 8/2011 |
| WO | WO 2011/117705 A2 | 9/2011 |
| WO | WO 2011/138537 A1 | 11/2011 |
| WO | WO 2011/153568 A1 | 12/2011 |

OTHER PUBLICATIONS

Meier, et al., "Catalytic Hydroliquefaction of Spruce Wood—Elemental Balance and Effect of Catalyst-" Journal of Wood Chem and Tech., 1988, vol. 8, No. 4, pp. 523-542.

Meier, et al., " Solvent-Free Hydroliquefaction of Pine Wood and *Miscanthus* Stems," In Proc. Int'l Conference on Biomass for Energy and Industry, Lisbon, Portugal, Oct. 1989.

Rocha, et al., "The Scope for Generating Bio-Oils with Relatively Low Oxygen Contents Via Hydropyrolysis," Organic GeoChem., 1999, vol. 30, pp. 1527-1534.

Sephton, et al., "Hydropyrolysis of High Molecular Weight Organic Matter in Murchison," Lunar and Planetary Science, 2003, XXXIV.

Guell, et al., "Effect of H2-Pressure on the Structures of Bio-oils form the Mild Hydropyrolysis of Biomass," Biomass and Bioenergy, 1993, vol. 5, No. 2, pp. 155-171.

Meier, et al., "Direct Catalytic Liquefaction Technology of Biomass Status and Review," Biomass Pyrolysis Liquids, 1991, pp. 93-102.

Meier, et al., "High Liquid Yields from Lignin Via Catalytic Hydropyrolysis," Advances in Thermochemical Biomass Conversion, 1994, vol. 2, pp. 1016-1031.

Nikkhah, et al., "Co-pyrolysis of Varous Biomass Materials and Coals," Energy from Biomass and Wastes, 1992, XVI, pp. 857-902.

Pindoria et al., "A Two-Stage Fixed-Bed Reactor for Direct Hydrotreatment of Volatiles," Fuel, Dec. 1998, vol. 77, No. 15, pp. 1715-1726.

D.S. Scott, et al., "The Continuous Flash Pyrolysis of Biomass," Can J Chem Eng., Jun. 1984, vol. 62, No. 3, pp. 404-412.

G. Love, et al., "Release of covalently-bound alkane biomarkers in high yields from kerogen via catalytic hydropyrolysis," Org. Geochem., 1995, vol. 23, No. 10, pp. 981-986.

(56) References Cited

OTHER PUBLICATIONS

L. Song, et al., "A new route to prepare supported nickel phosphide/sillica-alumina hydrotreating catalysts from amorphous alloys," Catalysis Today, Jul. 2007, vol. 125, No. 3-4, pp. 137-142 (Abstract).

C. Leyva, et al., "Surface characterization of Al2O3-SiO2 supported NiMo catalysts: An effect of support composition," Catalysis Today, Jan. 2008, vol. 130, No. 2-4, pp. 345-353 (Abstract).

D.J. Gunn, et al., "Heat transfer from vertical inserts in gas-fluidized beds," Int. J. Heat Mass Transfer, 1996, vol. 39, No. 16. pp. 3357-3365.

L.G. Jodra, et al., "Prediction of the bubble-size distribution in fluidized beds with internal baffles," Int'l Chem Eng., Jan. 1983, vol. 23, No. 1, pp. 18-30.

R.H. Overcashier, et al., "Some Effects of Baffles on a Fluidized System," A.l.Ch.E. Journal, Mar. 1959, vol. 5, No. 1, pp. 54-60.

J.B. Romero, et al., "Factors Affecting Fluidized Bed Quality," Chem. Eng. Prog. Symp. Ser., 1962, vol. 58, No. 38, pp. 28-37.

W. Volk, et al., "Effect of reactor internals on quality of fluidization," Chem, Eng. Prog., Mar. 1962, vol. 58, No. 3, pp. 44-47.

Meier, et al., "Effect of Hydrogen Pressure on Yields and Quality of Oils Obtained from Direct Liquefaction of Pine Wood," Energy from Biomass, 1989, vol. 4, pp. 584-592.

\* cited by examiner

BUBBLING BED CATALYTIC HYDROPYROLYSIS PROCESS UTILIZING LARGER CATALYST PARTICLES AND SMALLER BIOMASS PARTICLES FEATURING AN ANTI-SLUGGING REACTOR

GOVERNMENT RIGHTS

The U.S. Government has a paid-up license in this invention and the right in limited circumstances to require the patent owner to license others on reasonable terms as provided for by the terms of Contract No. DE-EE0002873 awarded by the U.S. Department of Energy.

BACKGROUND OF THE INVENTION

1. Field of the Invention

This invention relates to a process for thermochemically transforming biomass or other oxygenated feedstocks into high quality liquid hydrocarbon fuels.

2. Description of Related Art

Oxygenated feedstocks, such as solid biomass (wood, agricultural waste, waste paper, etc.) can be converted into liquid products via rapid heating in the absence of oxygen (pyrolysis). A solid char product (consisting mostly of carbon, but also containing any non-volatile, inert compounds found in the feedstock) and non-condensable vapors (such as $CO_2$ and $CH_4$) are produced, along with condensable species such as: water, hydrocarbons, and molecules that contain carbon atoms, hydrogen atoms, and oxygen atoms. The proportions of the resulting products obtained depends on the rate of heating of the feedstock particles, as described by Mohan, et al. (Mohan, Pittman, and Steele, "Pyrolysis of Wood/Biomass for Bio-oil: A Critical Review," in Energy & fuels, Volume 20, pp. 848-889, 2006). A type of biomass pyrolysis, referred to as "fast pyrolysis," minimizes the amount of char produced, and maximizes the amount of condensable liquid obtained, by heating the biomass as rapidly as possible. Some char is always produced, particularly since biomass always contains some non-volatile, non-reactive compounds (generally referred to as ash). Conventional pyrolysis of biomass, typically fast pyrolysis, does not utilize or require gaseous hydrogen or catalysts and produces a dense, acidic, reactive liquid product that contains water, oils, and char formed during the process. Because fast pyrolysis is most typically carried out in an inert atmosphere, much of the oxygen present in biomass is carried over into the liquid products obtained, which increases their chemical reactivity. The liquids from fast pyrolysis also contain high levels of acids (such as acetic acid), as well as olefins and polyaromatic hydrocarbons. The chemically unstable liquids produced by conventional pyrolysis tend to thicken over time and can also react to a point where hydrophilic and hydrophobic phases form. Dilution of pyrolysis liquids with methanol or other alcohols has been shown to reduce the subsequent activity and viscosity of the oils, but this approach is not considered to be practically or economically viable, because large amounts of unrecoverable alcohol would be required to stabilize large amounts of pyrolysis liquids for transport and subsequent use.

In conventional pyrolysis of biomass, carried out in an inert environment, the water-miscible liquid product is highly oxygenated and reactive, for example, with total acid numbers (TAN) in the range of 100-200, has low chemical stability for polymerization, is incompatible with petroleum hydrocarbons due to inherent water miscibility and very high oxygen content (on the order of about 40% by weight), and has a low heating value. As a result, transport and utilization of this product are problematic and it is difficult to upgrade this product to a liquid fuel due to retrograde reactions that typically occur in conventional pyrolysis and in conventional fast pyrolysis. Upgrading technologies, as applied to conventional pyrolysis liquids, tend to yield only small quantities of deoxygenated high-quality liquid hydrocarbons that are suitable for use as transportation fuels.

In addition, the separation of char generated during conventional pyrolysis from the liquid pyrolysis product presents a technical challenge due to the large amounts of oxygen, olefins, acids, and free radicals in hot pyrolysis vapors which remain highly reactive and form a pitch-like material when they come in intimate contact with char particles on the surface of a barrier filter, inertial separation device, or electrostatic precipitator. In particular, barrier filters used to separate the char from the hot pyrolysis vapors (prior to cooling and condensation of the liquid pyrolysis products) can quickly experience irreversible clogging (blinding) due to the reactions of char and reactive vapors that occur on and within the layer of char on the surface of the filter.

In order to upgrade conventional pyrolysis liquids, attempts have been made to react the conventional pyrolysis liquids with hydrogen, in the presence of solid catalysts, in order to remove oxygen from the liquids and produce a stable, useful hydrocarbon product. This process is referred to as hydroconversion. However, the upgrading of conventional pyrolysis liquids via hydroconversion is commercially non-viable. Hydroconversion of conventional pyrolysis liquids consumes significant $H_2$ at extreme process conditions, such as very high hydrogen pressures of 138 bar (2000 psig) or more. High specific pressures of hydrogen are required in order for the desired reactions to proceed, but these pressures create conditions wherein most of the oxygen removed from the liquid is removed via the formation of water ($H_2O$). This approach consumes large amounts of hydrogen, thus making the process economically unattractive. In addition, hydroconversion reactors often plug due to accumulations of coke precursors present in the pyrolysis oils or from coke products resulting from catalysis. The coke is a solid product, consisting mostly of carbon, and the maintenance needed to remove it from hydroconversion reactors reduces further the economic viability of hydroconversion of conventional pyrolysis liquids.

The present state of the art also describes a different means by which oxygenated feedstocks such as biomass can be converted to create useful liquid hydrocarbons, referred to as hydropyrolysis. Hydropyrolysis can be carried out with or without the aid of a catalyst However, lower hydrocarbon yields and lower deoxygenation tend to be a characteristic of noncatalytic hydropyrolytic processes. Therefore, as described herein, "hydropyrolysis" will be considered to refer to a catalytic pyrolysis process carried out in the presence of molecular hydrogen ($H_2$). Typically, the objective of conventional hydropyrolysis processes has been to remove heteroatoms (atoms other than carbon and hydrogen) from biomass, and maximize liquid hydrocarbon yield. In prior work by Meier, et al. (Meier, Jakobi and Faix, "Catalytic Hydroliquefaction of Spruce Wood," in the Journal of Wood Chemistry and Technology, Vol. 8, No. 4, pp. 523-542, 1988), the solid biomass feedstock was processed in a reactor containing liquid, in which solid biomass feedstock was suspended. The reaction was carried out at high internal pressures of over 138 bar (2000 psig) with recycled slurry oil and the lowest oxygen content reported for hydrocarbons produced was 7.6% by mass. This value was obtained when a precious metal palladium (Pd) catalyst was used. In another study by Meier and Faix (Meier and Faix, "Solvent-Free Hydroliquefaction of Pine Wood and Miscanthus Stems," in Proceedings of the International Conference on Biomass for Energy and Industry, Lisbon, Portugal, Oct. 9-13, 1989), in which a slurry oil was not used, the lowest oxygen content reported in the hydrocarbon product was 9.7% oxygen by mass, and the reaction was still carried out at high internal hydrogen pressures of over 138 bar (2000 psig) within a heated reactor with a NiMo catalyst.

In studies of single-stage hydropyrolysis of cellulose and other biomass-derived feedstocks, Rocha, et al. (Rocha, Luengo, and Snape, "The Scope for Generating Bio-Oils with Relatively Low Oxygen Contents via Hydropyrolysis," in Organic Geochemistry, Vol. 30, pp. 1527-1534, 1999) demonstrated that, with a FeS catalyst, as the partial pressure of hydrogen in the hydropyrolysis reactor was decreased, the oxygen content of hydrocarbon product tended to increase. Experiments carried out at lower hydrogen pressures typically produced hydrocarbon products with oxygen contents above 15%. In one case described by Rocha, et al., cellulose was subjected to hydropyrolysis at a hydrogen pressure of 99 bar (1440 psig), and the lowest oxygen content of resulting hydrocarbon product was 11.5% by mass. Unfortunately, this approach compromises economy, as it requires an external source of $H_2$ and must be carried out at high reactor pressures. In addition to requiring a continuous external input of hydrogen, such conventional hydropyrolysis processes produce excessive $H_2O$ which generally represents a waste stream. In this type of reactor, the hydropyrolysis of biomass has not been found to be economically attractive because the oxygen content of the hydrocarbon product was still fairly high after processing and the reaction conditions required by the process were too severe to be practical.

Finally, hydropyrolysis may be carried out in a fluidized bed (typically, a shallow fluidized bed with length:diameter ratio <1.5). However, the present invention pertains to means by which effective hydropyrolysis can be carried out in a single step in a deep fluidized bed of particles of an active catalyst, at $H_2$ partial pressures from 200 to 600 psig, in such a manner that the oxygen content of the liquid hydrocarbon product is reduced to below 4% by mass. Also, in the present invention, the hydropyrolysis reaction is exothermic and provides the heat of reaction so that there is no need to provide external heating or circulate hot regenerated catalyst or sand through the fluid bed reactor as is typically required for traditional pyrolysis. Fluidized beds generally include solid particles, such as particles of sand or catalyst, that are agitated and fluidized by a stream of gas, which travels upward through the bed and exits from the bed at or near the top of the reactor. The behavior of fluidized beds is known to at least partially depend on the depth (or height, or length) of the bed. The bed depth is generally characterized by the L/D ratio, meaning the ratio of the depth, height, or length of the bed, divided by the bed diameter. The behavior of the bed will depend heavily on the particle size distribution of the material from which the bed is formed. Generally, fluidized beds are designed with an L/D of 1-2, since beds in this range exhibit uniform fluidization, once a flow rate of fluidizing gas, sufficient to bring the bed particles into rapid motion, has been supplied. In this case, "uniform fluidization" means that, once fully-fluidized, the particles in the bed are in universal, random motion. Mixing and internal heat transfer within a fully-fluidized bed are both very rapid, and a relatively-shallow bed can often be operated in a nearly-isothermal manner, meaning that the temperature at any point within the bed is almost completely uniform.

Fluidized beds may be adversely affected by a phenomenon referred to as "slugging." Slugging develops in beds that have L/D ratios greater than 1.5-2.0 and fluidized beds composed of particles larger than a few hundred microns are especially prone to slugging. Slugging is a phenomenon in which a gas-filled bubble forms in the bed, and the diameter of the bubble rapidly expands to reach the full diameter of the bed. Then the entire bed above the bubble begins to move upward as a coherent body (a "slug"), with very little relative motion between particles in the "slug." The slug can rise for many bed diameters before the cohesion of the slug begins to break down, and the particles in the slug then drop rapidly back down toward the lower levels of the reactor. Usually, the bubble forms at an elevation of 1.5-2.0 reactor diameters above the bottom of the bed. While the slug is rising, a region of well-fluidized bed material can be observed in the lowest parts of the bed, with an open space, containing only the fluidizing gas, appearing between the top of the well-fluidized region and the bottom of the coherent slug. As the slug disintegrates, the bed material from the slug drops down onto the bed material in the lowest parts of the bed, suppressing fluidization until the bubble re-forms and the next slug is lifted. Slugging is usually cyclic or periodic, and, once it begins, it can continue with regularity until it is interrupted by a change in operating conditions. Slugging can also be affected by the properties of the bed material. Two beds, of equal depths and bulk densities, may behave very differently if the particle size distribution is different, or the sphericity of the particles in either bed is changed.

Slugging is undesirable for several reasons. Most importantly, when slugging occurs, longitudinal mixing in the bed is retarded, and particles from the highest points in the bed move very slowly down toward the bottom of the bed (and vice versa). The uniformity of axial temperature is thereby compromised, and considerable gradients in temperature can be observed along the height of the bed. Slugging also creates cyclical stresses on the walls and floor of the bed, particularly if the bed is disposed within a reactor, and the effect of cyclic loading and unloading on the reactor support structure, and the concomitant effect on process chemistry, can destroy any semblance of process uniformity. The vibration, or cyclical loading, of the reactor walls and support structure, can lead to mechanical failures, and the variation in the process chemistry will also make it impossible to operate with a useful level of process control. Slugging may also significantly increase the attrition of particles that comprise the fluidized bed, because the large-amplitude, cyclical motion of the bed tends to involve the bed particles in more energetic collisions with other particles and with the walls of the vessel within which the bed is contained.

As mentioned above, the problem of slugging can generally be avoided simply by using a shallower bed or, in some cases, using particles of smaller diameters. However, there are applications where a shallow bed is simply not practical. If the bed has catalytic properties that are essential to the process chemistry, then the weight of catalyst in the fluidized bed may need to be above some threshold, relative to the mass flow rate of vapors passing through the bed, in order for the desired reactions to occur. In the case of the present invention, the desired deoxygenation reactions that are required to carry out effective hydropyrolysis cannot be carried out in a shallow fluidized bed of catalyst. If the bed is too shallow, the vapors will exit the bed before the desired effect is achieved. The mass flow rate of fluidizing gas required to fluidize a bed also depends on the diameter of the bed. In some situations, particularly in pressurized reactors, the diameter of the bed must be held below a certain value, so that a gas velocity sufficient to fluidize the bed can be achieved with the available mass flow rate of fluidizing gas. The process of the present invention, as described below, preferably includes the use of a deep fluidized bed, composed of relatively large catalyst particles. Because this bed is inherently prone to slugging we have incorporated in this invention a means of curtailing slugging. Slugging is avoided or controlled via the use of an insert or other anti-slugging modification of the hydropyrolysis reactor, which is disposed within the fluidized bed. The design and application of the insert within the reactor or other modifications of the hydropyrolysis reactor to inhibit slugging are important aspects of the invention. The use of the insert or other anti-slugging modification of the hydropyrolysis reactor makes it possible for the fluidized bed to maintain proper fluidization and be of the required depth to carry out the desired hydropyrolysis reactions. The insert further makes it possible for the bed to be composed of relatively-large catalyst particles, which are large enough to be retained in the bed while smaller particles of solid residue (char) are elutriated and carried out of the bed within the gaseous product stream.

The behavior of a fluidized bed will vary depending on the flow rate of fluidizing gas passing through the bed. The process of the present invention, as described below, specifically involves a bubbling fluidized bed. In a bubbling fluidized bed, a flow rate of fluidizing gas is supplied that is sufficient to vigorously agitate and mix the bed, and is large enough that open voids, containing almost exclusively fluidizing gas, are formed. However, the flow rate is not large enough to entrain the solid catalyst particles from which the bed is composed in the gaseous exhaust stream and permanently separate them from the bed.

SUMMARY OF THE INVENTION

This invention relates to a process for thermochemically transforming biomass or other oxygenated feedstocks into high quality liquid hydrocarbon fuels. In particular, a catalytic hydropyrolysis reactor, containing a deep bed (length: diameter ratio >1.5) of fluidized catalyst particles is utilized. The reactor accepts particles of biomass or other oxygenated feedstocks that are significantly smaller than the particles of catalyst in the fluidized bed. The reactor preferably features an insert or other structure disposed within the reactor vessel that inhibits slugging of the bed and thereby minimizes attrition of the catalyst. Within the bed, the biomass feedstock is converted into a vapor-phase product, containing hydrocarbon molecules and other process vapors, and an entrained solid char product, which is separated from the vapor stream after the vapor stream has been exhausted from the top of the reactor. When the product vapor stream is cooled to ambient temperatures, a significant proportion of the hydrocarbons in the product vapor stream can be recovered as a liquid stream of hydrophobic hydrocarbons, containing less than 4% by mass of oxygen, with properties consistent with those of gasoline, kerosene, and diesel fuel. Separate streams of gasoline, kerosene, and diesel fuel may also be obtained, either via selective condensation of each type of fuel, or via later distillation of the combined hydrocarbon liquid.

It is one object of this invention to provide a process and/or apparatus by which biomass, or other oxygenated organic feedstocks, including solid biomass, such as ignocellulosic biomass as wood, agricultural byproducts, crop residues, and wastes, industrial wastes derived from such materials (e.g. paper and waste sludges), animal wastes (manures, offals, and sewage sludges), algal and similar uni- and multi-cellular aquatic biomass, wastes from the processing of fish, and mixtures of the above, etc., can be substantially converted to obtain a product stream consisting of hydrocarbons that are liquid under ambient conditions, contain less than approximately 4% oxygen by mass, and have properties, such as boiling points, heating values, and aromaticities, that are consistent with those of gasoline, kerosene and diesel fuel.

It is another object of this invention to provide a process and/or apparatus by which biomass, or other oxygenated organic feedstocks as described above, can be substantially converted to create the hydrocarbon liquid product describe herein above, under conditions where the partial pressure of hydrogen in the reactor of the process of the present invention is kept between approximately 200 psig and 600 psig It is another object of this invention to provide a process and/or apparatus by which solid residues, remaining after the conversion of the feedstock in the process of the present invention, are removed from the reactor of the present invention as entrained particles, carried out of the reactor by the stream of product vapor leaving the reactor.

It is another object of this invention to provide a process and/or apparatus by which entrained solid residues, carried out of the reactor of the process of the present invention, can be easily filtered from the stream of product vapors.

It is another object of this invention to provide a process and/or apparatus in which the exothermic deoxygenation reactions, occurring in the fluidized-bed hydropyrolysis reactor of the present invention, generate an amount of thermal energy sufficient to heat the incoming stream of feedstock to the temperature of the fluidized bed, as well as to overcome heat required to drive endothermic processes and reactions occurring in the bed during conversion of the feedstock.

It is another object of this invention to provide a process and/or apparatus by which the conversion of any of the aforementioned feedstocks can be carried out in a deep, bubbling fluidized bed, consisting of relatively-large catalyst particles, while employing the means of this invention to avoid slugging within the bubbling fluidized bed and minimize attrition of catalyst particles within the bubbling fluidized bed.

The subject invention preferably includes a process for producing liquid products from biomass (or other oxygenated solid, slurry, or liquid feedstock) in which the feedstock is rapidly heated in a reactor vessel containing molecular hydrogen and a deoxygenating catalyst, producing a deoxygenated pyrolysis liquid product having less than approximately 4% oxygen by mass, an aqueous liquid product containing water and water-soluble species, a solid char product, a product stream comprising non-condensable vapors, and process heat. The product vapor stream contains species including hydrogen, methane, ethane, propane, carbon monoxide (CO), and carbon dioxide ($CO_2$). The hydropyrolysis process of the present invention is generally carried out at hydrogen partial pressures of approximately 200 psig to 600 psig, which are much lower than would be required for effecting conventional hydrotreating or hydropyrolysis processes. The hydropyrolysis process of the present invention has been shown to convert at least approximately 24% by mass of dry, cellulosic biomass feedstock into deoxygenated liquid hydrocarbon products (see examples below).

The deoxygenated hydrocarbon liquid product, produced by the hydropyrolysis process of the present invention, includes primarily hydrocarbons that are liquid at ambient temperature and pressure; this product is hydrophobic, and not miscible with water.

The low oxygen content (generally less than 4% by mass) of the liquid hydrocarbon stream produced by the process of the present invention at low hydrogen partial pressure is desired. The high yield of deoxygenated liquid hydrocarbons from biomass feedstock is also desired. The ease with which solid residues (char and ash) can be removed from process vapors via filtration, is also desired. These characteristics derive from the high level of deoxygenation that is effected in the hydrocarbons that exit the hydropyrolysis reactor. When the highly deoxygenated gaseous hydrocarbons and char encounter a barrier filter, the gaseous vapors preferably contain no high boiling point components that could be adsorbed or reside on char particles and so the highly deoxygenated gaseous hydrocarbons are effectively separated from the char, which can then be easily removed from the filter by minimal levels of backpulsing. In conventional pyrolysis, particles of char adsorb and retain reactive pyrolysis oils. When these particles encounter a barrier filter they aggregate and create a dense, almost impermeable layer of char that resists cleaning by backpulsing.

Unlike the present invention, other processes described in the related art (conventional pyrolysis, hydropyrolysis, hydrotreating of conventional pyrolysis oils) all suffer from deficiencies which make it impossible to obtain the yields and products characteristic of the hydropyrolysis process of the present invention. A detailed comparison of experimental results obtained during development of the hydropyrolysis process of the present invention to the performance of other conventional biomass pyrolysis, biomass hydropyrolysis and hydrotreating processes is presented in examples that follow, below.

The hydropyrolysis reactor vessel of the process of the present invention preferably comprises an elongated deep bed fluidized bed reactor with a bed that preferably includes relatively-large catalyst particles. In the case where a solid feedstock is conveyed into the hydropyrolysis reactor of the process of the present invention, the feedstock is fed into said reactor in the form of particles that are substantially smaller in size than the catalyst particles in the bed, in order to maximize thermal decomposition of the biomass, minimize catalyst particle attrition, and permit effective separation of char from the fluidized bed and from the process vapor stream exiting the fluidized bed. In addition, one or more inserts or other anti-slugging modifications of the reactor may be disposed within the reactor to inhibit slugging of the fluidized bed during the hydropyrolysis process. A particular design approach, pertaining to inserts or other anti-slugging modifications of the hydropyrolysis reactor, is incorporated into the present invention, which makes it possible to prevent slugging of the bed disposed within the fluidized-bed reactor, even under circumstances where slugging would generally be expected to occur.

In the description of the present invention, the term "hydropyrolysis" is used to describe a process by which a biomass feedstock (to include but not be limited to all of the varieties of biomass enumerated in the Summary of the Invention, above) is rapidly heated and thermally decomposed, in the presence of solid catalyst particles and an atmosphere consisting largely of hydrogen gas. Further, the term "hydropyrolysis" will be used to refer to all reactions carried out on the products of thermal decomposition of the feedstock within the hydropyrolysis reactor. In the present invention, hydropyrolysis involves five classes of reactions. They are:
1) Devolatilization, wherein the feedstock is thermally decomposed to produce a solid char product (which contains a non-volatile, inert ash fraction), and products of decomposition that enter the vapor phase in the hydropyrolysis reactor.
2) Hydrodeoxygenation, wherein oxygen is removed from a molecule, and combined with hydrogen ($H_2$) to make water ($H_2O$).
3) Decarbonylation, wherein a carbon monoxide (CO) molecule is removed from the structure of a molecule.
4) Water-gas shift, wherein CO is reacted with $H_2O$ to make $CO_2$ and $H_2$.
5) Polymerization, wherein small olefins combine to make large molecules.
6) Olefin saturation, wherein hydrogen is added to an olefin to make a paraffin.

In the description of the present invention, the term "deoxygenation" refers to chemical processes by which chemically-bonded oxygen is removed from molecules (principally hydrocarbon molecules) and transferred to other chemical species such as water ($H_2O$), carbon monoxide (CO), or carbon dioxide ($CO_2$). As described above, the term "hydrodeoxygenation" refers to a subset of these processes where water is formed.

In the description of the present invention, the term "hydrotreating" refers to a range of chemical reactions in which hydrocarbon species (which may contain double and triple carbon-carbon bonds, benzene rings, five-carbon rings, chemically-bonded heteroatoms, and a wide variety of other functional groups) are reacted with molecular hydrogen ($H_2$), generally in the presence of a catalyst. Hydrotreating generally involves breaking a bond in the hydrocarbon molecule, and adding hydrogen to the structure of the hydrocarbon molecule, so that heteroatoms (such as oxygen and nitrogen) are removed, double and triple carbon-carbon bonds are saturated and substituted with carbon-hydrogen bonds, and ring structures are opened, resulting in linear hydrocarbon molecules. Hydrotreating can also involve "hydrocracking" (or "cracking") which involves the breaking of long hydrocarbon chains into shorter hydrocarbon chains, producing smaller molecules with lower boiling points.

In the description of the present invention, the term "hydroconversion" is defined as a reaction carried out in the presence of hydrogen, and generally a catalyst, which removes heteroatoms such as sulfur, nitrogen and oxygen or carries out cracking while adding hydrogen to the structure of the reactant molecule.

The catalytic hydropyrolysis process of the present invention provides a means to remove oxygen from biomass and other feedstocks containing significant quantities of carbon and chemically-bonded oxygen to produce light hydrocarbon products with a large portion of the oxygen removed directly from the feedstock-derived liquids. This is referred to as "deoxygenation." In the reactor described in the present invention, deoxygenation of molecules derived from the biomass feedstock inherently releases a large heat of reaction which provides the energy necessary to heat up cold biomass as it enters the bubbling fluid bed. However, one problem with conventional catalytic hydropyrolysis is the separation of the char and ash from the catalyst. Another potential problem with conventional catalytic hydropyrolysis, as carried out in a fluidized bed, is that rapid catalyst particle attrition could lead to high catalyst replacement costs and thus be uneconomical. The reactor described in this invention, which involves a bubbling fluidized bed hydropyrolysis system with catalyst particles that are much greater in size than the decomposed (reacted) feedstock residue, provides a novel way of mitigating catalyst attrition while at the same time ensuring that char and ash are separated from the catalyst by being attritted (reduced in size) and elutriated from the bubbling bed reactor. Elutriation occurs when a particle has been reduced in size to a point where it is entrained in the stream of gas exiting the top of the fluidized bed, and is removed permanently from the bed. Within the fluidized bed catalytic hydropyrolysis reactor described in the present invention, the char product of catalytic hydropyrolysis of the feedstock, being largely composed of carbon, acts as a lubricant within the bubbling bed and serves to protect the large catalyst particles from self-attrition. However, the action of the bed on the soft char and ash is such that the char and ash are effectively attritted by the catalyst and reduced to a size where the char and ash are readily elutriated from the bubbling bed. The problem of char and ash removal from the fluidized bed of catalyst is thereby addressed.

Note that in the present invention, it may be advantageous to process efficiency and quality for more than one type of catalyst to be disposed within the bed. In the simplest case, two physically and chemically different catalysts could be disposed within the bed. Because the two types of catalyst could be engineered to possess different densities or sizes, the catalysts could intermix within the fluidized bubbling bed, or one catalyst could tend to rise to the top of the bed (e.g. by being lighter or being sized to possess a lower aerodynamic diameter) so that the chemistry of this process can be effected in a stepwise manner. Clearly, in a vertically extended bubbling fluidized bed, a number of catalysts could be disposed so that some could intermix while others would maintain different vertical positions in the bed.

In the present invention, biomass or other solid feedstock particles are fed into the fluidized-bed catalytic hydropyrolysis reactor preferably near the bottom of the bed, and are rapidly heated and decomposed to produce solid ash, char residue, and vapor-phase products. The ash, char and vapors then travel up through the bed, where the process vapors (and solid particles small enough to be aerodynamically entrained) are carried permanently away from the upper surface of the fluidized bed where they exit the reactor.

While the process described above could be carried out in a shallow fluidized bed (meaning that the bed has an L/D ratio of 2 or less), it is preferably carried out in a deep fluidized bed (with an L/D of approximately 10 or greater). A deep fluidized bed, particularly one comprised of relatively-large catalyst particles, will develop slugging, and cannot be operated without a slug-breaking insert. The insert should consist of obstacles, obstructions, or constrictions, positioned at regular intervals within the bed, and oriented or contoured in such a way that a coherent slug of bed material cannot form along the full length of the bed. The use of the insert makes operation of the reactor with a deep bed possible, and provides three advantages, relative to operation of the reactor with a shallow bed:

1. The deep bed brings process vapors into contact with catalyst particles for a longer period of time, since the path taken by product vapor through the deep bed is much longer than it would be if it were traversing a shallow bed.
2. The mass flow rate of fluidizing gas (which, in the case of this invention, comprises of principally hydrogen) needed to fluidize the bed depends on the bed diameter. If a deep bed is used, a large quantity of catalyst can be fluidized by a relatively small mass flow rate of fluidizing gas. For example if the diameter of a catalyst bed is reduced, so that the L/D of the bed is increased from 1.5 to 10, while maintaining a constant volume of catalyst in the bed, the mass flow rate of fluidizing gas needed to obtain the same degree of fluidization in the bed is reduced by a factor of 3.5. This effect is essential in order to improve the economic viability of the process.
3. The obstructions, obstacles, or constrictions associated with the slug-breaking insert can be instrumented, and equipped with internal features that allow them to remove or add heat to the bed. The obstructions, obstacles, or constrictions interact directly with the bed, at radial locations that may include the center of the reactor. This approach allows more efficient heat transfer to occur at specific locations in the bed than would be the case if heat transfer were occurring only across the outer wall of the reactor, and enhances process control, since the local temperature at each point in the bed can be better managed.

The vapor stream leaving the top of the fluidized bed includes the fluidizing gas, any product vapors that have been generated by thermal decomposition and hydropyrolysis of the feedstock, and any solid particles (ash, char or attritted catalyst fines) that are small enough to be aerodynamically entrained in said vapor stream. The process described by this invention specifies that product vapor species leaving the fluidized bed must be sufficiently chemically stable so that they will be substantially unable to react with other product vapor species, or with solids entrained in the vapor stream, or with solid surfaces with which the vapor stream comes into contact, such as a barrier filter. In practice, this means that the most unstable species produced by the initial thermal decomposition of the feedstock, such as aldehydes and acids, should be substantially deoxygenated via reaction with hydrogen in the catalytic fluidized bed. The combined stream of vapors and entrained solids can be passed through an inertial separation device such as a cyclone or virtual impactor, an electrostatic precipitator (ESP), and/or filter elements, or some combination of the above, and will not form a dense cake on the cyclone, ESP plate, or filter surfaces, or create fouling as the solid particles are filtered out of the vapor stream.

Any appropriate inertial separation device, porous filter, electrostatic precipitator, or other means of removing solids from the vapor stream may be employed once the vapor stream (with entrained solids) has exited the reactor containing the fluidized bed. If a cyclone or virtual impactor is used first to remove the larger solids entrained in the vapor stream, and a porous filter is then used to remove the remaining fines entrained in the vapor stream, the majority of the char and ash leaving the reactor can preferentially be collected from the cyclone, while the majority of the attritted catalyst can be recovered from the filter. This is because the catalyst is much harder than the char, and will break down primarily into very fine particles, which will pass through the cyclone to the filter. The char, on the other hand, is softer and less durable, and will be broken down into a range of particle sizes by the grinding action of the fluidized bed. The larger particles of char will be trapped primarily by the cyclone, and will not reach the filter. Finally, if the catalyst is disposed to remain as a metallic material that can be magnetized, particles comprised of attrited catalysts may be efficiently collected in a filter or inertial separation device that can be periodically energized with a magnetic field to entrap the magnetic particles. Deenergizing the magnetic field would allow these particles to be removed and recovered en masse.

Once the entrained solid particles have been removed from the stream of process vapors, the vapors can either be cooled to ambient temperature immediately, at which point all species with boiling points below ambient temperature will condense to form liquids, or the stream of process vapors can be directed to a subsequent reactor or reactors for further treatment.

One approach is to send the filtered process vapors from the hydropyrolysis reactor to a second-stage reactor, where the process vapors can be further hydrogenated using a hydroconversion catalyst. This approach can be used to produce a product stream containing substantially fully deoxygenated hydrocarbon species, water vapor, a gaseous mixture comprising CO, $CO_2$, and light hydrocarbon gases ($C_1$-$C_4$) and further process heat. If this approach is used, the overall process may be referred to as integrated hydropyrolysis and hydro conversion.

It must also be noted that, while biomass is an ideal feedstock for use in the hydropyrolysis process described above, the feedstock sent into the fluidized-bed hydropyrolysis reactor need not be biomass, and need not be composed only of solids. Any feedstock which can be subjected to hydropyrolysis, under the conditions described above, and which yields products similar to those described above, could be fed into the reactor. Thus, feedstock streams containing polymers or plastics, or feedstock streams comprising slurries of solid particles suspended in a carrier liquid, or feedstocks streams comprising a carrier gas, in which solids or liquids are entrained, or feedstock streams comprising, completely or in part, of liquids that can be deoxygenated and reacted with hydrogen to produce deoxygenated hydrocarbons, can be subjected to hydropyrolysis via the method described in the present invention. If liquids are present in the feedstock stream these liquids must be able to evaporate and enter the vapor phase very shortly after they are introduced into the fluidized bed. The set of reactions occurring in the process of the present invention are primarily vapor-phase reactions, and liquids initially present in the feedstock stream, or formed via chemical decomposition of the feedstock stream, must enter the vapor phase in order to be effectively processed by the fluidized-bed reactor of the present invention.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
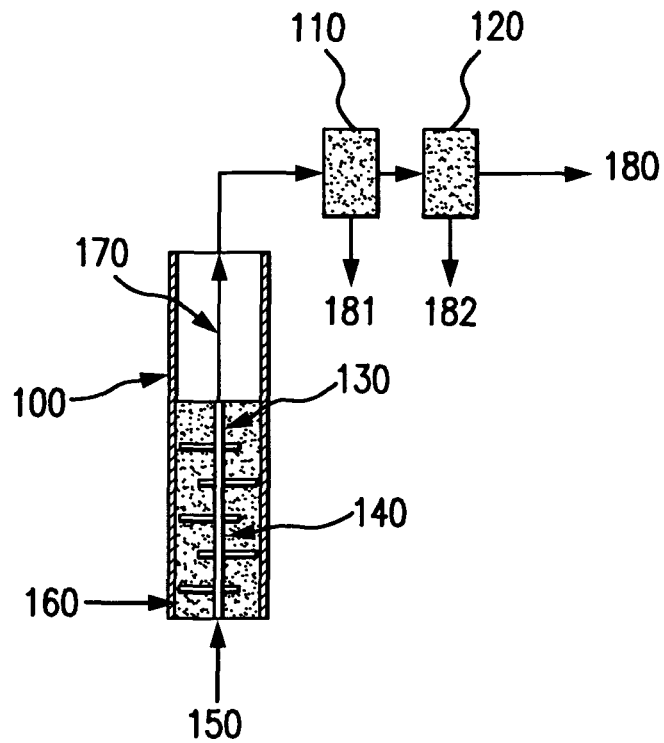
FIG. 1 is a schematic flow diagram of a hydropyrolysis process for producing liquid fuels from biomass or other feedstocks in accordance with one embodiment of this invention.

A schematic diagram of the process described in the present invention is shown in FIG. 1. A fluidizing gas stream 150, consisting primarily of hydrogen, but possibly also containing other gases, is fed into the bottom of a fluidized-bed reactor vessel, 100. The fluidizing gas stream passes through a bed of catalyst particles, contained within the fluidized-bed reactor vessel, and fluidizes the bed to a point where its state is consistent with that of a bubbling fluidized bed. An insert 130, or other modification to the interior of the vessel, is present, and interacts with the bed 140 in such a way that slugging is prevented. The depth of the bed is therefore not limited by the diameter of the vessel, and a deep bed, whose axial dimension may be many times greater than the diameter of the vessel, can therefore be employed.

The mass flow rate of fluidizing gas, passing through the bed, is determined by the size and fluidization characteristics of the catalyst particles. In the present invention, the catalyst particles are approximately spherical, and are approximately 3200 microns or more in diameter, but could be smaller or larger. The density of each particle can vary from 0.5 to 2 kilograms per liter. Based on laboratory studies, a superficial velocity of fluidizing gas of approximately 1 to 1.5 meters/second is needed to achieve effective fluidization of a bed of this type. The superficial velocity is defined as the average velocity that the fluidizing gas would achieve if it were passing through the empty reactor vessel, in the absence of a fluidized bed. The diameter of the vessel is governed primarily by the amount of fluidizing gas available, and the depth of the bed is governed by the amount of catalyst needed to achieve the requisite deoxygenation of the feedstock. There is no definite upper limit to the depth of the bed, since the use of an anti-slugging insert, or anti-slugging modifications within the reactor, as specified in the present invention, ensures that slugging is avoided, no matter how deep the bed in the reactor becomes. The bed should be as deep as necessary to achieve the desired degree of reaction of the process vapors released by the feedstock. The mass flow rate of fluidizing gas should not exceed the minimum required to achieve fluidization. If a higher flow rate of fluidizing gas is employed, the material and equipment costs associated with the fluidizing gas stream will increase, and catalyst particles, which have been attritted to some extent, but are still useful, will be elutriated from the bed. This result is not desirable, so the mass flow rate of fluidizing gas is not increased above the minimum needed to fluidize the bed.

The distribution of temperature within the fluidized bed as described in the present invention is nearly uniform, due to the rapid exchange of heat between particles in motion throughout in the bed. The temperature of the bed must be at least 343 degrees Celsius (650 degrees Fahrenheit) and need not be higher than 593 degrees Celsius (1100 degrees Fahrenheit). The exact operating temperature of the bed depends upon the composition of the feedstock that is to undergo hydropyrolysis, the characteristics of the catalyst, and the desired composition of products that is to be obtained.

The pressure within the fluidized-bed reactor vessel must be such that the partial pressure of hydrogen is about 200 psig to 600 psig. The exact operating pressure of the fluidized-bed reactor depends upon the composition of the feedstock that is to undergo hydropyrolysis, the choice of catalyst, and the desired composition of products that are to be obtained.

The feedstock that is to undergo hydropyrolysis is fed into the bottom of the fluidized bed, near the point where the fluidizing gas enters the reactor. The feedstock is introduced in such a way that it is heated very rapidly from ambient temperature to the temperature of the fluidized bed, by interacting with the fluidized bed. The feedstock is introduced into the fluidized bed in such a manner that any solid residues (remaining after the feedstock has been heated to the temperature of the bed) form distinct solid particles, which are significantly smaller in size than the particles of catalyst of which the bed is primarily composed. These particles will then be transported to the top of the bed, and, if they are sufficiently small, they will be entrained in the gas and vapor stream and carried out of the bed. If they are not sufficiently small to be entrained, the particles will continue to move around in the fluidized bed, and will undergo attrition, until they are small enough to be entrained and carried out of the bed. In the case of biomass feedstocks, the feedstock is prepared and introduced as distinct, approximately-spherical, particles, up to, but not exceeding, the diameter of the catalyst particles in the bed. In the present invention, the rapid heating of the feedstock causes the feedstock to decompose, driving off vapor-phase products of thermal decomposition and leaving behind a solid product (referred to as char) which comprises primarily carbon, but also includes any non-volatile, inorganic material (ash) initially present in the feedstock. Individual particles of solid residues remaining after decomposition generally contain both carbonaceous char and ash within a single coherent structure.

Since these particles of solid residue consist largely of carbon, and are physically softer than the catalysts that comprise the bed, they are more readily subject to abrasion, attrition, or grinding. They lubricate the catalyst particles as they move within the fluidized bed, and are broken into smaller particles much more rapidly than the particles of catalyst. This lubricating effect provides a significant benefit, since catalyst fines that are ground down to sizes small enough to be entrained in the stream of gas leaving the top of the bed will be carried out of the bed, and no longer be available to promote chemical reactions. The lubricating effect of char moving around in the fluidized bed serves to reduce the rate of catalyst attrition, and thereby reduce the need (and cost) for replacement catalyst needed to maintain the desired degree of chemical reactivity within the bed.

In one embodiment of the present invention, wherein solid particles of biomass comprise the feedstock, the feedstock undergoes very rapid thermal decomposition into product vapors and a relatively soft solid material composed of char and ash (char being the dominant portion). This residue is frequently referred to as char. This char is rapidly ground up (attritted) by particles of catalyst in the fluidized-bed reactor, which are significantly larger than the char particles, until the char is sufficiently reduced in size (and aerodynamic diameter) so that its terminal velocity is lower than the upward velocity of the fluidizing gas and product vapors. At this point, the attritted char is elutriated and is carried out of the bed while the relatively large and heavy catalyst particles remain behind in the bed. This effect can be promoted and accelerated if the solid particles in the biomass feed are significantly smaller, in their largest dimension, than the catalyst particles in the fluidized bed. Further, the attritted particles of char in this embodiment of the present invention act as a micro-scale lubricant, and reduce attrition of catalyst particles in the fluidized bed. Thus, catalyst attrition is lower when biomass is hydropyrolyzed in the reactor than it would be if only the fluidized catalyst particles were present.

The rate at which feedstock is fed into the reactor depends upon the amount of catalyst and partial pressure of hydrogen within the reactor. The relationship between the rate at which feedstock is sent into the bed, and the amount of catalyst present in the bed, can be quantified in terms of a volume hourly space velocity (VHSV). The VHSV can be calculated by dividing the volumetric flow per hour of feedstock sent into the reactor by the bulk volume of the catalyst present in the bed, in the absence of any fluidizing gas flow. In the present invention, the hydropyrolysis reactor can be operated over a catalyst VHSV range of 1 $hr^{-1}$ to 45 $hr^{-1}$. The exact catalyst VHSV that is appropriate for a given combination of feedstock and catalyst depends on the nature of the feedstock and catalyst, and on the desired composition of the products that are to be obtained. The atmosphere in the reactor should consist largely of hydrogen (though other inert gases, like $CO_2$, may also be present), and the feedstock flow rate cannot be so great that the vapor-phase products of feedstock decomposition dilute the hydrogen atmosphere to a point where the required partial pressure of hydrogen needed to carry out the desired set of reactions is no longer available.

The most important reactions that are carried out in the hydropyrolysis reactor as described in the present invention involve deoxygenation of oxygenated hydrocarbon molecules. These oxygenated hydrocarbon molecules contain oxygen that is initially present in the feedstock, and the oxygen is often present in the form of functional groups that make the oxygenated hydrocarbons very chemically reactive. The hydropyrolysis reactor of the present invention removes these oxygen atoms from the hydrocarbon molecules with which they are associated. Within the reactor, the oxygen can be converted either into water vapor ($H_2O$) or the carbon-containing vapor-phase species carbon monoxide (CO) and carbon dioxide ($CO_2$). If some of the oxygen from the feedstock is initially removed via a reaction that forms CO (decarboxylation), and some is initially removed in reactions that form $H_2O$ (hydrodeoxygenation), the CO and $H_2O$ molecules can react to form $CO_2$ and $H_2$. This latter reaction is referred to as a water-gas shift reaction, and, since it liberates an $H_2$ molecule, it can be useful in reducing the amount of hydrogen that is sent into the reactor in the stream of fluidizing gas. The relative amounts of CO, $CO_2$ and $H_2O$ that are present in vapors exiting from the top of the fluidized bed in the reactor depends on the feedstock, operating conditions, and catalyst characteristics. The set of reactions that occur during deoxygenation of the feedstock release significant net amounts of heat, since the heats of formation of CO, $CO_2$, and $H_2O$ are high enough to overcome the amount of heat required to effect heating and endothermic thermal decomposition of the feedstock, and the chemical decomposition of oxygenated molecules in the process vapors. The surplus of heat generated via deoxygenation of the feedstock is at least sufficient to heat the incoming feedstock up to the temperature of the fluidized bed, and supply the heat consumed by any endothermic processes, including evaporation of liquid species, occurring during hydropyrolysis of the feedstock.

The product gases and vapors exiting the top of the fluidized bed must have certain characteristics, in order for the process described in the present invention to be carried out successfully. First, they must consist largely of hydrogen. Second, small particles of solids (char and ash, as well as attritted catalyst) must be entrained within them. At steady-state, the mass flow rate of entrained solids leaving the top of the fluidized bed must equal the rate at which solid residue is generated by hydropyrolysis of the feedstock in the fluidized bed, plus the rate at which catalyst is being attritted to form fines small enough to be elutriated. Third, the vapors must contain the hydrocarbon species produced when the feedstock is hydropyrolyzed. Fourth, the molecules composing the hydrocarbon vapors must be sufficiently deoxygenated and chemically stabilized so that they do not react rapidly with other hydrocarbon molecules, or with solid surfaces with which they may come into contact. Fifth, the total oxygen content, by mass, of condensable hydrocarbons in the product vapor stream must be 4% or less. The term condensable, in this case, indicates that the species in question have boiling points of 21 degrees Celsius (70 degees Fahrenheit) or lower, at atmospheric pressure, or are highly soluble, and not subject to rapid vaporization, when dissolved in a liquid with a boiling point below 21 degrees Celsius (70 Fahrenheit).

The stream of product gases and vapors exiting the top of the fluidized bed therefore contains hydrogen, water vapor, CO, $CO_2$, and entrained solid particles. It also contains hydrocarbon products of hydropyrolysis of the feedstock, including methane, ethane, propane, butane, and a variety of other hydrocarbon molecules with atmospheric-pressure boiling points conforming to those of gasoline, kerosene, and diesel fuel. Some hydrocarbons, with oxygen in their molecular structure, and/or other heteroatoms such as nitrogen, sulfur and phosphorus, may also be present in the vapor stream leaving the fluidized bed. Other vapors, such as $H_2S$ and ammonia may also be present, depending on the composition of the feedstock. However, the product vapors are sufficiently chemically stable that they can be effectively separated from the entrained solid particles by filtration, inertial, or electrostatic means, without plugging or otherwise impairing the separation devices through which they pass.

In the present invention, the product vapor stream emanating from the top of the fluidized-bed reactor vessel 100, is kept hot enough to prevent condensation of any liquid product, and then conveyed to one or more particle separation devices 110, 120. In one preferred embodiment, inertial separation and filtration are employed in series and occur first in a primary separation system 110 (e.g. a cyclone or virtual impactor), which removes larger particles consisting primarily of char and ash. The gases and vapors are then conveyed to a hot filtration system 120 (for example, a porous barrier filter that may or may not be enhanced with a magnetic separation step) which removes all remaining entrained solid particles, and may produce a solid stream consisting primarily of catalyst fines from the fluidized bed. However, any other effective means by which the char can be removed from the stream of hot process gases and vapor may be applied.

The product vapor stream can then be cooled in order to condense the water and condensable liquid hydrocarbon product, or the product vapor stream can be directed to another reactor for further processing. If the products of hydropyrolysis are cooled to condense liquid products, and transferred to an environment where the pressure is at or near ambient pressure, and the temperature is at or near 21 degrees Celsius (70 degrees Fahrenheit) two liquid phases are recovered. One phase floats on top of the other, and this upper phase comprises hydrophobic hydrocarbons, and contains less than approximately 4% by weight of oxygen. The lower phase comprises primarily water, as well as any water-soluble species produced by the process. The hydrocarbon phase comprises primarily hydrocarbons with properties consistent with those of gasoline, kerosene, and diesel, fuel.

In accordance with one embodiment of this invention, the feedstock subjected to hydropyrolysis comprises primarily of a type of biomass, such as certain species of algae, containing a significant fraction of lipids. When subjected to hydropyrolysis, this type of feedstock will yield significant quantities of deoxygenated diesel oil, which could otherwise be made from lipids extracted from the algae. In addition, hydropyrolysis of algae containing a significant fraction of lipids will also yield additional gasoline and diesel hydrocarbons which are produced as a result of hydropyrolysis of non-lipid fractions of the algae (cell walls, etc.). This is particularly attractive because lipid extraction from algae, via, for example, hexane-based solvent-stripping, is expensive. It should also be noted that conventional fast pyrolysis of algae biomass would be very unattractive because the uncontrolled thermal reactions that occur during fast pyrolysis would degrade the lipids in the algae feedstock. Thus, the process of the present invention is ideal for algae conversion because it can be carried out on algae feedstocks, which are usually only partially dewatered, and still produce high quality diesel and gasoline hydrocarbons as a resulting product.

The process of this invention provides several distinct advantages over conventional fast-pyrolysis-based processes in that it produces a liquid hydrocarbon product that contains low or negligible amounts of solid char, very little oxygen, is chemically stable, and is hydrophobic. Hot filtration of solid char from the product vapor stream is generally not possible with fast-pyrolysis vapors, particularly when biomass is used as the feedstock. However, hot filtration of solid char is readily applied to biomass hydropyrolysis product vapor streams in accordance with the process of the present invention. In addition, fast pyrolysis of biomass feedstocks does not yield a stream of hydrophobic, deoxygenated liquid product, meaning that recovery of a useable liquid hydrocarbon fuel, from liquids produced via fast pyrolysis of biomass presents a significant technical challenge. However, recovery of a useable stream of liquid hydrocarbon fuel from hydropyrolysis of biomass, via the process of the present invention, is straightforward, as described above.

Because the liquid hydrocarbon fuels produced in the process of the present invention possess an inherently low oxygen content, the water-based (aqueous) liquid product stream produced by this process remains relatively free of dissolved hydrocarbons and will likely contain less than 5% by mass dissolved total organic carbon (TOC). Due to this relatively low TOC concentration, the stream of aqueous liquid product can be handled and disposed of with relative ease. The stream of aqueous liquid product will also contain a concentration of dissolved ammonia that will depend on the amount of nitrogen initially present in the feedstock.

The hydropyrolysis process of the present invention produces primary streams of char, water, steam, hydrogen, hydrocarbon gases such as methane, ethane and propane, and liquid hydrocarbon fuels. These can be integrated with other processes that produce biomass or fuels from related renewable feeds. In addition, secondary streams of nutrients can be obtained from the hydropyrolysis process of the present invention, which may be useful in promoting biomass growth. Ammonia is one such nutrient, which can be recovered from the process of the present invention, and can be used as a fertilizer, in order to promote biomass growth. Char obtained from the process can also be used as a soil amendment to improve the cultivation of crops such as corn and sugar cane. Biomass feedstocks amenable to production in a process integrated with the process of the present invention include, but are not limited to, algae, jatropha, corn stover, wood, bagasse, switchgrass, miscanthus, and nuts (or nut husks and shells). Processes producing high-value nutraceutical products, obtained from plants or other crops, can also be integrated with the process of the present invention.

Furthermore, the embodiment of the hydropyrolysis process of the present invention that converts corn stover to liquid transportation fuel can be integrated into facilities which produce ethanol from corn. The water and steam produced by hydropyrolysis of corn stover could find use in the production of corn ethanol, which typically requires both energy and water as inputs. Wastes from the corn ethanol production can likewise be utilized as feeds for the hydropyrolysis process.

The biomass hydropyrolysis process also can be integrated into a petroleum refinery. The char from the hydropyrolysis process can be burned to produce energy in refinery furnaces thereby reducing refinery greenhouse gas emissions, since $CO_2$ emissions from renewable sources do not count as greenhouse gas emissions. The hydrocarbon liquids from the hydropyrolysis process can go directly to the refinery hydrotreating units for further upgrading and are fully compatible. The C1-C3 hydrocarbon gases from the hydropyrolysis unit can go to the hydrogen plant to make the hydrogen required for the hydropyrolysis.

Preferred Catalyst Characteristics

In order for hydropyrolysis to be carried out effectively in the fluidized-bed reactor, as described in the process of the present invention, the catalyst preferably includes several characteristics:

1. The particles of catalyst must be approximately-spherical, with particle diameters significantly greater than the diameter of solid feedstock residues formed during hydropyrolysis. Catalyst particle densities of approximately 0.5 to 2 kilograms per liter are necessary, so that the catalyst will be effectively retained in the bed while char and other small particles (which have much lower particle densities and aerodynamic diameters than the catalyst) are elutriated from the bed.
2. The particles of catalyst must provide sufficient catalytic activity to allow the hydropyrolysis process of the present invention, described above, to proceed under the conditions specified above.
3. The particles of catalyst must effectively catalyze the deoxygenation reactions of the process of the present invention, without catalyzing reactions that would form excessive amounts of solid carbonaceous residue (coke) on the catalytically-active surfaces of the catalyst.
4. The particles of catalyst must be resistant to attrition, so that the amount of catalyst attritted per day, week, month, or year of operation is low enough to be easily replaced, without compromising the economic viability of the process. Generally, the use of spherical catalyst particles (as opposed to other shapes) will produce the lowest rate of attrition.

As described above, the hydropyrolysis catalyst of the present invention is disposed within a fluidized-bed reactor, and the bed of catalyst has an L/D ratio significantly greater than 2. Slugging of the bed, during operation, is avoided via the use of an anti-slugging insert or other anti-slugging modification of the reactor (described in greater detail below). The size of the catalyst particle is determined by the smallest size to which solid particles in the feedstock stream can be reduced, without compromising the practicality or commercial viability of the process. Generally, if particles of a solid feedstock, such as biomass, are reduced below approximately 2800 microns in a commercial operation, the cost of grinding and preparation of the feedstock can significantly rise. In order for the solid residue produced from solid particles of feedstock that are approximately 2800 microns in diameter, to rise easily through the bed, and eventually be elutriated from the bed, without a concomitant loss of catalyst, a particle size of 3200 microns or more is generally specified for the catalysts in accordance with the process of the present invention. In cases where smaller feedstock particles can be applied in practice, the catalyst particle size may then be reduced, providing that the catalyst particles remain large enough to be effectively retained in the fluidized bed while the solid residues of hydropyrolysis are elutriated.

The process requires an active catalyst that effectively deoxygenates and chemically stabilizes the hydropyrolysis vapors, but that is not so catalytically active that it rapidly cokes. The catalyst in the fluidized bed of the present invention can be any highly active deoxygenation catalyst which reduces the collective oxygen content of produced hydrocarbon vapors with more than four carbons in their molecular structure ($C_4+$ hydrocarbons) to less than 4% oxygen. Preferably, the catalyst in the fluidized bed must meet the requirements outlined above, and carry out the requisite reactions at a VHSV of greater than 1 $hr^{-1}$. A variety of catalysts may be employed in the fluidized hydropyrolysis bed of the present invention; however, catalysts generally in accordance with preferred embodiments of this invention are as follows:

In one preferred embodiment, the catalyst comprises spherical particles of porous alumina or some other appropriate support, which have been impregnated with catalytic material consisting of Nickel and Molybdenum (NiMo) or Cobalt and Molybdenum (CoMo), and have then been sulfided. Catalysts comprising sulfided NiMo or CoMo on a porous alumina support material have been shown to be good catalysts for hydropyrolysis and exhibit good deoxygenation activity in experimental testing. As described above, spherical catalyst particles are required in fluidized beds to minimize attrition. If catalysts are not spherical they will quickly attrit, and excess catalyst losses will occur that can threaten the economic viability of the process.

In another embodiment of the process of the present invention, the catalyst comprises spherical particles of porous alumina or some other appropriate support impregnated with nickel, or cobalt, or iron, or other metals which can be used for hydrotreating. Any metal or combination of metals, impregnated into an appropriate support, which is appropriate for use in hydrotreating, can also be used as a hydropyrolysis catalyst in the process of the present invention, as long as the resulting material displays sufficient catalytic activity to reduce the collective oxygen content of the $C_4+$ hydrocarbon vapors present in the hydropyrolysis product stream to less than 4% by mass, while releasing enough exothermic heat of reaction to maintain a stable fluidized bed temperature in the hydropyrolysis reactor.

In one preferred embodiment of the present invention, the feedstock comprises solid biomass particles comprising a bulk density of approximately 0.2 to 0.4 kilograms per liter, and the catalyst particles comprise a bulk density of approximately 0.7 to 1.2 kilograms per liter. The difference in the bulk density of the feedstock and catalyst in this embodiment ensures that the solid residue (char) of biomass hydropyrolysis is rapidly conveyed through the fluidized bed and elutriated.

Preferred Insert Characteristics

As discussed above, the fluidized bed of catalyst particles of the present invention is deep enough that it is prone to slugging. In order to ensure that slugging does not occur, an anti-slugging insert or other anti-slugging modification of the reactor vessel is employed. There are several strategies that can be employed to mitigate slugging in fluidized beds, that do not involve the insertion of obstructions, obstacles, or constrictions into the bed. However, these cannot be usefully applied in the case of the present invention. Two of these other anti-slugging strategies are:

1. Inclined Bed. Inclining the reactor has been shown to eliminate slugging, and to increase axial mixing in a fluidized bed under certain conditions. However, the radial distribution and velocity of the gas flow increases in non-uniformity as the angle of inclination is increased. This creates a condition wherein the majority of fluidizing gas and process vapors can bypass the catalyst in the bed, and the desired hydropyrolysis reactions cannot be carried out.
2. Spouted Bed/Conical Bed. It is also possible to build a conical reactor vessel, one which is wider at the top than at the bottom. This arrangement is often referred to as a spouted bed. The slope of the reactor wall, in this case, can interrupt the formation and propagation of a slug to some extent. However, it is much more difficult to manufacture a conical reactor vessel than it is to manufacture a reactor vessel with straight, vertical sides. Moreover, the velocity of fluidizing gas in the reactor is much higher near the bottom of a conical reactor, where the cross-sectional area of the cone is smallest, than near the top. This effect generally creates a space near the base of the cone where there is no bed material at all, because the velocity of the fluidizing gas is so high that the bed material is lifted out of this space. The high fluidizing gas velocity in this region can also create excessive catalyst attrition.

Inserts and Vessel Modifications Featuring Lateral Obstacles or Obstructions

Because inclined and conical beds do not provide a practical means by which slugging can be controlled in the hydropyrolysis process of the present invention, a different approach is employed. According to a preferred embodiment of the present invention, one or more inserts 130, such as that shown schematically in FIG. 1, are included and/or installed in the fluidized-bed reactor 100, preventing the formation of slugs, and enabling rapid, uniform axial and radial mixing in deep beds. In the present invention, this approach is applied in a hydropyrolysis reactor, where unusually deep fluidized beds 140, composed of large particles, are employed.

Figures 2A, 2B:
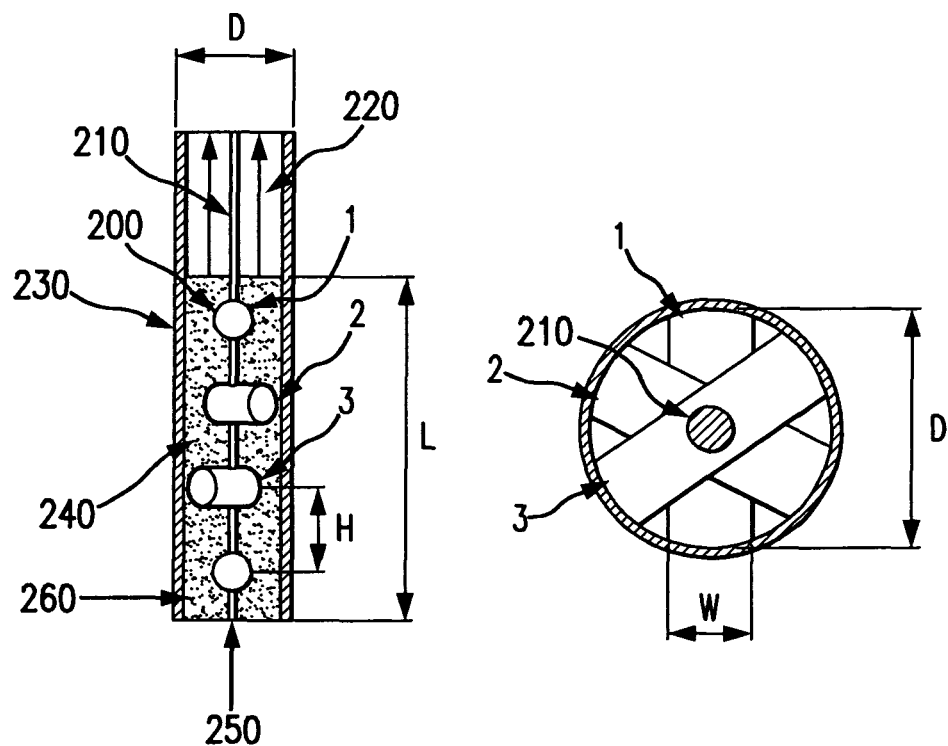
FIG. 2A is a schematic view of a vessel containing an insert, with slug-breaking obstructions attached to an axial support in the center of the vessel, according to one embodiment of this invention.
FIG. 2B is a top down view of the insert shown in FIG. 2A.

FIG. 2 shows a reactor having a vessel wall 230 defining a fluidized bed 240 into which feedstock particles 260 are fed along with a fluidizing gas stream 250. Process vapors 220 are schematically shown leaving the fluidized bed 240. In one embodiment of the present invention, slugging is minimized or prevented via the installation of lateral obstructions 200 installed on a central support rod, as shown in FIG. 2A. The obstructions 200 extend at least part of the way from the centerline of the reactor to the reactor wall 230, on at least one side of the center line. In a preferred embodiment, the obstructions extend all the way across the reactor, and, at their longest point, have a length that is equal to the reactor diameter, D. The width of the obstruction, W, is such that the obstruction covers approximately 40% of the cross-sectional area of the reactor. The obstructions 200 are installed at regular axial intervals, H, equivalent in length to approximately one to two diameters of the bed. The orientations (shown in FIG. 2B as 1, 2, 3) of the obstructions 200 are adjusted so that the axis of each obstruction is separated by 60 degrees of rotation from the axis of the obstructions above and below it, as shown in the top-down view in FIG. 2B. This arrangement ensures that a coherent slug of bed particles, occupying the full diameter of the reactor, cannot form, and cannot propagate along the axis of the reactor. In order to prevent slugging throughout the entire bed, the obstructions should be installed in such a way that they extend along the full height of the fluidized bed, L, once the bed is fully fluidized. The top of the fluidized bed should extend less than one reactor diameter, D, past the top of the uppermost obstruction.

In other embodiments of the present invention, a wide range of obstruction geometries can be applied to disrupt the formation of slugs in the bed, including rectangular tabs, obstructions with triangular cross sections, obstructions with diamond-shaped cross-sections, obstructions with oval cross-sections, gratings, etc. Open areas in the obstructions, or open areas of the reactor cross section, are preferably not aligned with each other, and should overlap as little as possible, when seen from above.

Dead spots in the fluidized bed 240 may form on the upper surface of obstructions 200, if the obstructions are not designed correctly. In a dead spot, solid particles come to rest on the upper surface of the obstruction, and do not move around in the fluidized bed. In order to prevent this effect, the upper surface of the obstructions should be sloped, peaked, or rounded, so that bed material cannot rest on the top surface of the obstruction.

Another approach to suppress the formation of dead spots is to employ a porous insert or insert that employs a porous upper portion so that hydrogen, for example, can be made to flow through the central support 210 and be conveyed to the porous or partially porous slug-breaking cylindrical obstructions deployed along the length of the central support 210.

In some cases, it may be advantageous to allow limited slugging, or cyclical expansions of the fluidized bed 240 that do not fully meet the definition of slugging, in the uppermost part of the bed. This may be necessary in order to more effectively grind up large particles of solid hydropyrolysis residue into smaller sizes that can be elutriated from the bed 240. If this effect is desired, a portion at the top of the expanded bed 240 can remain unobstructed, in which case, this section of the bed will tend to slug (if it extends for a sufficient distance) or may begin to oscillate up and down in a periodic manner, without displaying the coherent bed motion that is characteristic of slugging.

The type of obstruction 200 shown in FIG. 2 can be used to prevent slugging in beds with very large length to depth (L/D) ratios, because a slug tends to require an unobstructed path of axial travel equal to approximately 1 to 2 bed diameters to form, and the installation of these obstructions interrupts the slug just as it would begin to become coherent. Since the obstructions are placed at intervals of approximately one to two diameters, D, there is no section of the fluidized bed 240 within which a coherent slug can form.

The action of the bed 240 will tend to abrade the material of the obstructions 200, and may limit the useful lifetime of the obstructions 200. In one embodiment, which can be employed in situations where this is a concern, the insert may be constructed in such a way that it is easily removed and replaced.

In another embodiment, the obstructions and central support of the insert can be made to be highly abrasion-resistant, by, for example, making them from a ceramic or glass-ceramic material or from a ceramic-coated material. A combination of materials could also be used, where, for example, those components likely to see the most wear are made of an extremely hard material, and other components, such as the central support rod 210, are made of metal.

In another embodiment, the surfaces of the insert and the vessel walls 230 can be formulated so that they are also catalytically active, and contribute to the catalytic activity needed to complete the process chemistry in the reactor.

In another embodiment, the lateral obstructions 200 are equipped with means by which they can be heated or cooled, and/or are equipped with instrumentation allowing the local temperature of the fluidized bed 240 to be measured and/or regulated.

In another embodiment, the lateral obstructions 200 are not attached to a central support, but are attached to, or installed directly upon, the reactor vessel wall 230. If this embodiment is applied, the obstructions cannot be easily removed from the reactor, and replaced, as part of a single coherent insert. However, this embodiment allows access to the interior of each obstruction, through the location at the vessel wall where the obstruction is attached. Means of heat transfer, instrumentation, and/or steam generation can then be applied within each obstruction 200, through the locations where the obstructions 200 are attached to the vessel wall 230.

Inserts and Vessel Modifications Featuring Constrictions

Figure 3A:
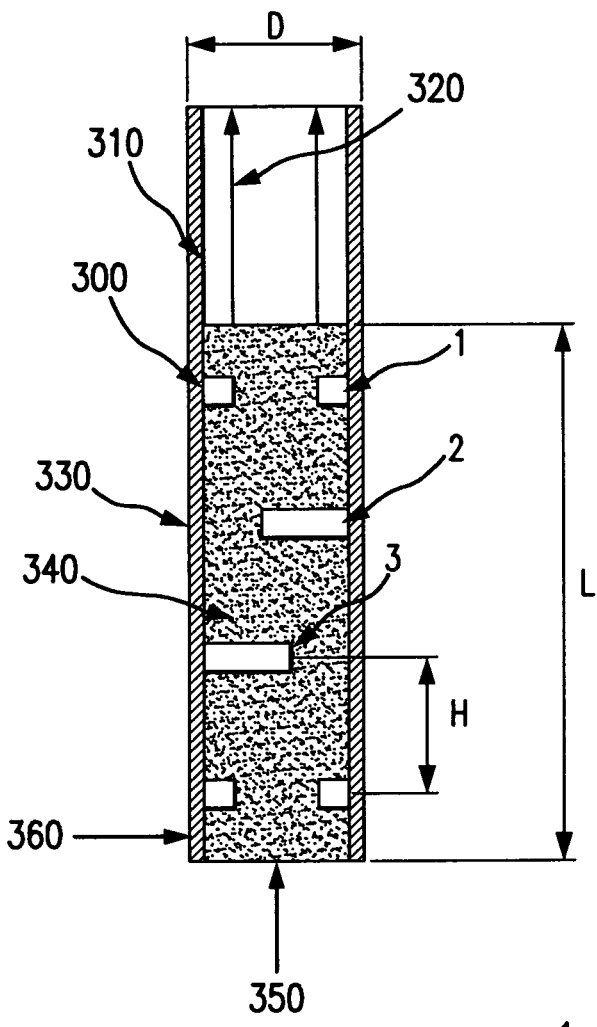
FIG. 3A is a schematic view of a vessel containing an insert, with slug-breaking constrictions attached to a support at the circumference of the vessel, according to one embodiment of this invention.

Constrictions 300 of the bed diameter, such as those shown schematically in FIG. 3, can have the same slug-breaking effect created by lateral obstacles or obstructions 200. According to this embodiment of the present invention, one or more inserts 130, such as that shown schematically in FIG. 1, are included and/or installed in the fluidized-bed reactor 100, preventing the formation of slugs, and enabling rapid, uniform axial and radial mixing in deep beds. As described above, this approach is applied in a hydropyrolysis reactor, where unusually deep fluidized beds 140, composed of large particles, are employed.

Figure 3B:
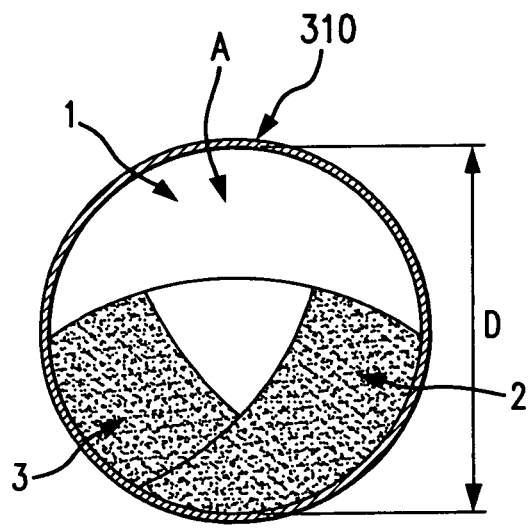
FIG. 3B is a top down view of the insert shown in FIG. 3A.

FIG. 3 shows a reactor having a vessel wall 330 defining a fluidized bed 340 into which feedstock particles 360 are fed along with a fluidizing gas stream 350. Process vapors 320 are schematically shown leaving the fluidized bed 340. In one embodiment of the present invention, slugging is minimized or prevented via the installation of constrictions of the reactor cross-section, 300 installed on a circumferential support, as shown in FIG. 3. The cross-sectional area, A, of the constriction 300 is such that the constriction covers approximately 40% of the cross-sectional area of the reactor. The constrictions 300 are installed at regular axial intervals, H, equivalent in length to approximately one to two diameters of the bed. The orientation of the constrictions 300 is adjusted so that the centerline of the open area of each constriction is separated by 120 degrees of rotation from the centerline of the open area of the constrictions above and below it, as shown in the top-down view in FIG. 3B. This arrangement ensures that a coherent slug of bed particles, occupying the full diameter of the reactor, cannot form, and cannot propagate along the axis of the reactor. In order to prevent slugging throughout the entire bed, the constrictions should be installed in such a way that they extend along the full height of the fluidized bed, L, once the bed is fully fluidized. The top of the fluidized bed should extend less than one reactor diameter, D, past the top of the uppermost constriction.

In other embodiments of the present invention, a wide range of constriction geometries can be applied to disrupt the formation of slugs in the bed, including constrictions with multiple openings, rounded contours, irregular contours, etc. Open areas in the constrictions, or open areas of the reactor cross section not blocked by the constrictions, are preferably not aligned with each other, and should overlap as little as possible, when seen from above.

As is the case when obstructions or obstacles are installed in the bed, dead spots in the fluidized bed 340 may form on the upper surface of constrictions 300, if the constrictions are not designed correctly. In order to prevent this effect, the upper surface of the constriction should be sloped, peaked, or rounded, so that bed material cannot rest on the top surface of the obstruction.

Another approach to suppress the formation of dead spots is to employ a porous constriction or constriction that employs a porous upper portion so that hydrogen, for example, can be made to flow through tubes deployed along the circumferential support 310 and be conveyed to the porous or partially porous slug-breaking cylindrical obstructions deployed along the length of the central support 310.

In some cases, it may be advantageous to allow limited slugging, or cyclical expansions of the fluidized bed 340 that do not fully meet the definition of slugging, in the uppermost part of the bed. This may be necessary in order to more effectively grind up large particles of solid hydropyrolysis residue into smaller sizes that can be elutriated from the bed 340. If this effect is desired, a portion at the top of the expanded bed 340 can remain unobstructed, in which case, this section of the bed will tend to slug (if it extends for a sufficient distance) or may begin to oscillate up and down in a periodic manner, without displaying the coherent bed motion that is characteristic of slugging.

The type of constriction 300 shown in FIG. 3 can be used to prevent slugging in beds with very large length to depth (L/D) ratios, because a slug tends to require an unobstructed path of axial travel equal to approximately 1 to 2 bed diameters to form, and the installation of these constrictions interrupts the slug just as it would begin to become coherent. Since the constrictions are placed at intervals of approximately one to two diameters, D, there is no section of the fluidized bed 340 within which a coherent slug can form.

The action of the bed 340 will tend to abrade the material of the constrictions 300, and may limit the useful lifetime of the constrictions 300. In one embodiment, which can be employed in situations where this is a concern, the insert may be constructed in such a way that it is easily removed and replaced.

In another embodiment, the constrictions and circumferential support of the insert can be made to be highly abrasion-resistant, by, for example, making them from a ceramic or glass-ceramic material, or from a ceramic-coated material. A combination of materials could also be used, where, for example, those components likely to see the most wear are made of an extremely hard material, and other components are made of metal.

In another embodiment, the surfaces of the insert and the vessel walls 330 can be formulated so that they are also catalytically active, and contribute to the catalytic activity needed to complete the process chemistry in the reactor.

In another embodiment, the constrictions are equipped with means by which they can be heated or cooled, and/or are equipped with instrumentation allowing the local temperature of the fluidized bed 340 to be measured and/or regulated.

In another embodiment, the constrictions 300 are not attached to a removable support, but are attached to, or installed directly upon, the reactor vessel wall 330. If this embodiment is applied, the constrictions cannot be easily removed from the reactor, and replaced, as part of a single coherent insert. However, this embodiment allows access to the interior of each constriction, through the location at the vessel wall where the constriction is attached. Means of heat transfer, instrumentation, and/or steam generation can then be applied within each constriction 300, through the locations where the constrictions 300 are attached to the vessel wall 330.

General Information on Anti-Slugging Obstructions and Constrictions

Each type of slug-breaking obstacle can be installed either on a central support, extending along the axis of the reactor, or on a circumferential support, extending around the exterior of the reactor. There is no requirement that a particular type of slug-breaking feature be installed on a particular type of support in order for it to be effective.

The vertical cross-section of a slug-breaking feature may be contoured to remove or accentuate sharp angles. More rounded contours will be more wear-resistant, while more sharp-edged contours may break slugs more effectively.

In fluidized-bed reactors that are lined with a molded or cast refractory material, the refractory can be molded or cast in such a way that the slug-breaking features are integral to the reactor lining.

Combinations of obstructions and constrictions of different shapes, or alternating obstructions (attached to a central support) and constrictions (projecting into the bed from the circumference of the reactor) may provide optimal bed motion.

Obstructions and constrictions need not be installed horizontally across the reactor and can be installed at some angle other than 90 degrees relative to the central axis of the bed.

Obstructions can be circular or rounded in cross section, when seen from the top of the reactor.

If desired, obstructions can project from a central support on only one side of the centerline of the reactor, extending outward toward the wall of the reactor. As long as obstructions of this type are properly arranged, the formation of slugs may be effectively disrupted.

In general, the obstructions or constrictions at each location in the reactor should create a pressure drop equal to about 10-20% of the total pressure drop that the entire fluidized bed would create if there were no obstructions or constrictions present.

Finally, obstructions or constrictions deployed within the fluidized bed can incorporate heat exchangers so that they can perform the dual function of mitigating slug formation and managing bed temperature increases associated with the exothermic nature of the present invention. These heat exchangers can be used to create process steam (e.g. converting liquid water to steam) or to use liquids to refine temperature distributions within the bed that may be caused by deploying catalysts of differing activity that will stratify and segregate into distinct layers within the bed by choice of density, aerodynamic diameter, or both.

EXAMPLES

Fluidized Bed Mixing Studies without Insert

Experiments were carried out in order to study slugging in bubbling fluidized beds, consisting of relatively large, spherical solid particles similar to the catalyst used in the hydropyrolysis process of the present invention. The bed material consisted of porous alumina spheres, with a mean diameter of 1800 microns. The diameters of the particles of bed material were all within plus or minus 200 microns of the mean diameter. The bulk density of the bed material was 0.75 kilograms per liter.

Fluidized beds expand as fluidizing gas is passed through them, so they are most readily compared on an unexpanded basis. In this case, the unexpanded depth of the bed is the depth of the bed when no fluidizing gas is passing through it.

Beds with an unexpanded L/D near 6 were studied in two clear plastic tubes. One tube had an inner diameter of 3.33 centimeters, and the other had an inner diameter of 7.62 centimeters. The smaller tube had a grid at its base for distribution of fluidizing gas. The tube with the larger diameter had an inverted conical base, with a 90 degree included angle in the cone, and a central gas jet at the apex of the cone. Beds of the alumina spheres described above, were found to require a characteristic minimum fluidization velocity ($U_f$) of approximately 0.61 meters/second to 0.76 meters per second. The minimum fluidization velocity, $U_f$, is the velocity at which the pressure drop across the bed ceases to rise with increasing superficial gas velocity through the bed, but at which no motion is observed in the bed. Once the flow of gas through the bed in each clear plastic tube was raised above $U_f$, the bed expanded until its volume reached approximately 1.5 times the unexpanded volume, and then bulk motion began. Slugging in both tubes was observed when the unexpanded L/D was 6 and bulk motion occurred in the bed.

Slugging in both tubes could only be avoided if the unexpanded L/D ratio of the bed was less than 1.5. The phenomena affecting bulk motion in the bed did not appear to be influenced either by the diameter of the tube in which each test was carried out, or by the very different flow distribution methods associated with each tube (the sparging grid in the case of the tube with the smaller diameter, and the spouted base in the case of the tube with the larger diameter). The tendency of the bed to slug was therefore found to occur whenever the bed of porous alumina spheres had an unexpanded L/D greater than 1.5, and the phenomena responsible for the onset and propagation of slugging were not found to be sensitive to the diameter of the test apparatus, or the means used to introduce the fluidizing gas into the bottom of the bed.

Fluidized Bed Mixing Studies with Insert

Further studies were carried out in the larger plastic tube, in order to examine the effect on slugging of introducing lateral obstructions, attached to an insert. The insert consisted of a metal rod, located at the centerline of the tube, with various obstructions and obstacles installed on it in order to break up the coherent slug of alumina spheres.

Near the bottom of the tube, three steel washers were installed at intervals of 7.62 centimeters. The lowest of these washers was installed at an elevation of 7.62 centimeters (or one tube diameter, D) above the bottom of the tube. The diameter of each washer was about 2.54 centimeters, meaning that the washer obstructed about 10% of the cross-sectional area of the tube. The circular obstructions (washers) increased the gas velocity as the gas passed around the obstruction, visibly interrupting the formation and propagation of slugs in the bed. However, it was observed during initial trials that the bed above the last washer displayed a pronounced tendency to slug, and the addition of further washers above this level had little to no effect on the slugging. Circular obstacles around the centerline were therefore found to provide little benefit at unexpanded bed depths greater than L/D=2 (with the expanded bed, after fluidization occupying a depth with an L/D ratio of approximately 3).

During this work it was noted that the integrity of the slug was important in the development of slugging. Within the slug, either the entire bed has to move as a single body, or the slug begins to collapse immediately. In order to make the slug collapse, and eliminate the problem of slugging, rectangular tabs were cut and drilled so they could be installed on the same metal rod. The outer edge of each tab was rounded so as to conform to the interior wall of the tube. Three tabs were prepared with a width of 2.54 centimeters and a length of 3.18 centimeters. Each tab obstructed approximately 20% of the cross-sectional area of the tube, and reached from the central rod to the reactor wall, meaning that the fluidizing gas had to accelerate as it passed each tab, and the bed particles in the slug had to rearrange themselves in order to pass around this obstacle. The tabs were installed at axial intervals of 7.62 centimeters, with the lowest tab located 7.62 centimeters above the base of the tube. When a slug of bed material began to form and encountered the obstruction created by the tabs, the obstruction created enough motion within the slug that the slug's cohesion was disrupted. Open gas passages formed around the tab, and particles dropped out of the slug and down toward lower levels of the bed.

Two arrangements of tabs were examined: In one, the tabs were placed on alternating sides of the reactor with the orientation of each tab separated from that of the next in line by 180 degrees; in the other, they were arranged so that each tab was oriented 120 degrees from the tab above and below.

A systematic effort was then made to study slugging in the clear plastic tube with the internal diameter of 7.62 centimeters, using beds of alumina spheres with an unexpanded L/D of 3, and a superficial fluidizing gas velocity of 0.91 meters per second. A population of spheres in the general bed, with diameters slightly less than 1700 microns, was identified, separated by sieving, and dyed red. The rest of the bed was white. The red spheres could be mixed into the bed, and readily recovered. The motion and distribution of red spheres in the bed provided a means by which mixing and particle distribution in the bed could be observed directly, and quantified.

A protocol to examine the rate of mixing was developed, which involved depositing a layer of red spheres on top of the white spheres in the bed, and then starting a stopwatch at the same time that the fluidizing gas flow was sent through the bed. When red balls first became visible at the very bottom of the bed, the stopwatch was stopped, and this was then referred to as the characteristic mixing time observed for the bed, under a given set of experimental conditions.

The characteristic mixing time of the bed, in the absence of any slug-breaking insert, was found to be:

15 seconds. Slugging was observed to occur.

The insert configurations described above (tabs separated by 180 degrees and tabs separated by 120 degrees) were then tested.

The characteristic mixing time obtained with tabs arranged at 180 degrees was found to be:

5.3 seconds. Slugging was not observed to occur.

The characteristic mixing time obtained with tabs arranged at 120 degrees was found to be:

5.0 seconds. Slugging was not observed to occur.

Slugging was not observed when either insert was employed within the 7.62 centimeter clear plastic tube. The mixing times obtained with the inserts were both shorter than the shortest mixing time observed when the reactor had no insert. The 120 degree tab-separation angle arrangement is particularly effective, since the flowing gas can never find a single clear, unobstructed route to the top of the bed, and has to change its path each time it encounters a tab. While some cyclical bubble formation was still observed, the bubbles could not occupy the entire tube diameter, and could not travel up the entire length of the bed. Mechanisms that would have caused the bed to slug were thereby defeated.

Finally, a deeper bed, with an unexpanded L/D of 5.5, was tested. When expanded, this bed had an L/D of approximately 7.5.

With the 120-degree-tab-separation-angle insert in the bed, the deeper L/D=5.5 bed was found to mix rapidly and uniformly. However, a portion of the expanded bed extended above the uppermost tab, and slugging occurred in this uppermost portion of the bed. This result indicates that tabs need to be positioned at axial intervals of approximately 1 to 2 bed diameters, throughout the entire expanded depth of the bubbling fluidized bed, in order to prevent slugging from occurring. If this methodology is followed, it appears that in the absence of other limitations there is no upper limit to the depth of the bed; one could accommodate as many tabs as necessary in order to create a bed with any desired depth, and no slugging would occur at any point in the bed.

The examples described above were conducted with obstructions (washers, tabs) located at axial intervals of one tube diameter. Obstructions installed at intervals that are larger or smaller than this will also break slugs. An optimal arrangement and spacing of obstructions exists for any given bed. Axial spacings greater than 2 diameters, however, are not likely to yield optimal longitudinal mixing, as a coherent slug may be able to form between obstructions if the obstructions are too far apart. Likewise, spacings that are too tight (obstructions too close together) will slow the return of bed material to the bottom of the reactor, increase the mixing time, and introduce non-uniformities into the axial temperature profile of the bed.

The upper, rectangular obstructions (tabs) that were tested in the apparatus above obstructed about 20% of the open area of the bed. These obstructions need not be rectangular; a wide variety of other shapes could be considered (triangular, oval, diamond, etc).

Significantly, based on the tests described above that were carried out with a bed of unexpanded L/D=5.5, it appears that a bed of essentially unlimited depth could be fluidized, without slugging, while maintaining rapid longitudinal mixing, if properly oriented obstructions or constrictions are placed at appropriate intervals along the axis of the bed. If the entire bed were enclosed in an isothermal environment (such as a long, multi-zone furnace, in which each zone is maintained at the same temperature) the entire bed would stay at essentially the same temperature. Alternatively, in a very long, deep bed (very large L/D ratio) axial variations in bed temperature could be induced by changing the local temperature around the reactor, since the rate of heat exchange along the axis of the bed is finite.

Experimental Process Demonstration

The table below compares experimental results obtained during demonstrations of the process of the present invention with processes representing the state of the art of pyrolysis and hydropyrolysis. As is clear from the table, the process of the present invention differs significantly from the state of the art, and employs a much lower partial pressure of hydrogen to remove much more oxygen from the finished liquid hydrocarbon product. Results from two experimental demonstrations of the process of the present invention are presented. These are referred to as Case 1 and Case 2. The same feedstock (wood) was used in both cases. The experiments in both cases were carried out at the same hydrogen partial pressure of 325 psig (23 bar absolute). Catalyst particles consisting of a nickel-impregnated porous alumina material were used in Case 1 (Catalyst A). Catalyst particles consisting of a porous alumina support, impregnated with a sulfided cobalt-molybdenum material were used in Case 2 (Catalyst B). The fluidized bed in Case 1 was kept at a slightly different temperature than in Case 2.

Figure 4:
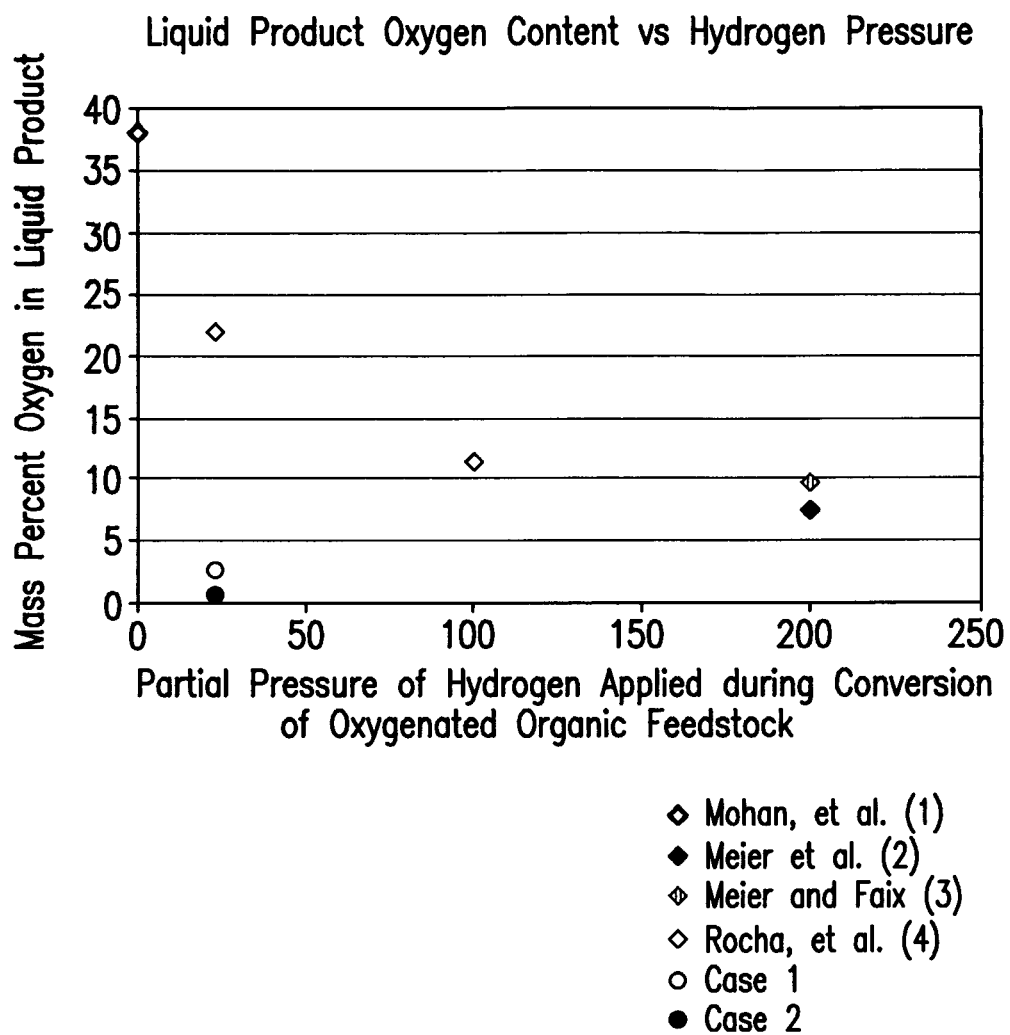
FIG. 4 is a graph of liquid product oxygen content as a function of hydrogen partial pressure.

Further information is presented in FIG. 4 which presents a graph that relates oxygen content in liquid hydrocarbon products to the partial pressure of hydrogen used during processing. As is clear from the plot, processes described by the present state of the art are able to produce hydrocarbon products with low oxygen content only if very high partial pressures of hydrogen are utilized during processing. The hydrogen partial pressure of 325 psig (23 bar absolute) applied during processing of biomass in Cases 1, and 2 would be expected to yield a liquid product containing approximately 22% oxygen, by mass. Instead, the process of the present invention, as demonstrated in Cases 1, and 2, produced significant yields of liquid hydrocarbon products with oxygen contents lower than 4% by mass.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

| Process Characteristic | Mohan, et al. (1) | Meier, et al. (2) | Meier and Faix (3) | Rocha, et al. (4) | Rocha, et al. (4) | Present Invention Case 1 Feb. 25, 2010 | Present Invention Case 2 Mar. 9, 2011 |
|---|---|---|---|---|---|---|---|
| Feedstock | Wood | Wood | *Miscanthus* stems | Cellulose | Cellulose | Wood | Wood |
| Process | Fast Pyrolysis | Hydro-pyrolysis | Hydro-pyrolysis | Hydro-pyrolysis | Hydro-pyrolysis | Hydro-pyrolysis | Hydro-pyrolysis |
| Fluidized Bed | Yes | No | No | No | No | Yes | Yes |
| Hydrogen Used | No | Yes | Yes | Yes | Yes | Yes | Yes |
| $H_2$ Pressure (bar absolute) | N/A | Appr. 200 | Appr. 200 | 100 | 25 | 23 | 23 |
| Catalyst | No | Pd on C | NiMo | FeS | FeS | Catalyst A | Catalyst B |
| Solvent | No | Yes | No | No | No | No | No |
| Feedstock Heating | Rapid | Slow | Slow | Rapid | Rapid | Rapid | Rapid |
| Temperature Degrees C. | ~480 | 380 | 420 | 520 | 520 | 453 | 396 |
| Residence time | Seconds | 1.25 hours | 55 min | Seconds | Seconds | Seconds | Seconds |
| Liquid hydrocarbon yield with less than 4% oxygen | 0% | 0% | 0% | 0% | 0% | 24% | 26% |
| % oxygen in liquid product | ~38 | 7.6 | 9.7 | 11.5 | 22 | 2.6 | 0.68% |

Sources:
1. Mohan Pittman, and Steele, "Pyrolysis of Wood/Biomass for Bio-oil: A Critical Review," in Energy & fuels, Volume 20, pp. 848-889, 2006
2. Meier, Jakobi and Faix, "Catalytic Hydroliquefaction of Spruce Wood," in Journal of Wood Chemistry and Technology, Vol. 8, No. 4, pp. 523-542, 1988
3. Meier and Faix, "Solvent-Free Hdroliquefaction of of Pine Wood and *Miscanthus* Stems," in Proceedings of the International Conference on Biomass for Energy and Industry, Lisbon, Portugal, Oct. 9-13, 1989
4. Rocha, Luengo, and Snape, "The Scope for Generating Bio-Oils with Relatively Low Oxygen Contents via Hydropyrolysis," in Organic Geochemistry, Vol, 30, pp. 1527-1534, 1999

SOURCES

1. Mohan, Pittman, and Steele, "Pyrolysis of Wood/Biomass for Bio-oil: A Critical Review," in Energy & fuels, Volume 20, pp. 848-889, 2006
2. Meier, Jakobi and Faix, "Catalytic Hydroliquefaction of Spruce Wood," in Journal of Wood Chemistry and Technology, Vol. 8, No. 4, pp. 523-542, 1988
3. Meier and Faix, "Solvent-Free Hydroliquefaction of Pine Wood and Miscanthus Stems," in Proceedings of the International Conference on Biomass for Energy and Industry, Lisbon, Portugal, Oct. 9-13, 1989
4. Rocha, Luengo, and Snape, "The Scope for Generating Bio-Oils with Relatively Low Oxygen Contents via Hydropyrolysis," in Organic Geochemistry, Vol. 30, pp. 1527-1534, 1999

We claim:
1. A method of hydropyrolysis comprising:
a. introducing an oxygenated organic feedstock into a fluidized bed reactor, wherein said feedstock is rapidly heated from ambient temperature to the temperature of the fluidized bed, and is thereby devolatilized;
b. introducing a stream of fluidizing gas comprising mostly molecular hydrogen into the fluidized bed reactor, creating conditions under which rapid mixing and heat transfer occur throughout the fluidized bed;
c. maintaining a deep bed of solid particles of catalyst, the depth of which is significantly greater than 2 reactor diameters, in a state of vigorous motion, to promote reactions resulting in deoxygenation and chemical stabilization of vapors produced when the feedstock is devolatilized;
d. removing solid residues, remaining after devolatilization and hydropyrolysis of the feedstock, from the fluidized bed reactor via entrainment in the stream of fluidizing gas and product vapors exiting the fluidized bed reactor;
e. removing attritted residues of catalyst, but not intact particles of catalyst, or particles of catalyst that have been minimally attritted, from the fluidized bed reactor via entrainment in the stream of fluidizing gas and product vapors exiting the fluidized bed reactor;
f. separating the solid residues, entrained in the stream of fluidizing gas and product vapors exiting the fluidized bed reactor, from the stream of fluidizing gas and product vapors exiting the fluidized bed reactor;
g. recovering a product stream of hydrocarbon vapors comprising hydrocarbon species with atmospheric-pressure boiling points, consistent with those of at least one of gasoline, kerosene and diesel fuel, from the hydropyrolysis process as condensed liquid;
h. releasing enough exothermic heat from the deoxygenation reactions occurring during hydropyrolysis of the feedstock to supply process heat required by endothermic processes occurring during hydropyrolysis of the feedstock, including chemical reactions, heating of feedstock, and evaporation of liquids; and
i. dispersing one or more modifications to an interior of the reactor vessel, in such a manner that slugging does not occur within the fluidized bed reactor.

2. The method of claim 1 wherein the fluidized-bed reactor is maintained at a partial pressure of hydrogen of about 200 psig to 600 psig.

3. The method of claim 1 wherein the recovered stream of condensed liquid contains less than 4% by mass of oxygen.

4. The method of claim 1 wherein the temperature of the fluidized bed reactor is between approximately 343 degrees Celsius (650 degrees Fahrenheit) and approximately 593 degrees Celsius (1100 degrees Fahrenheit).

5. The method of claim 1 wherein the relationship between a volumetric feed rate of solid feedstock particles and a volume of the fluidized bed reactor is such that the Volume Hourly Space Velocity (VHSV) of the reactor is between approximately 1 and approximately 40.

6. The method of claim 1 wherein a density of particles of catalyst is in the range of approximately 0.5 kilograms per liter to 2 kilograms per liter.

7. The method of claim 1 wherein the feedstock is prepared in such a way that solid residues, remaining after hydropyrolysis of the feedstock, are substantially smaller, in their largest dimension, than the solid catalyst particles that form the fluidized bed.

8. The method of claim 1 wherein the feedstock contains no water.

9. The method of claim 1 wherein the feedstock is only partly dewatered, and contains some water.

10. The method of claim 1 wherein the feedstock comprises particles of solid biomass.

11. The method of claim 1 wherein the feedstock comprises solid particles of an oxygenated polymer, such as polyethylene terephthalate.

12. The method of claim 1 wherein the feedstock comprises a wholly or partially dewatered biomass feedstock that is high in lipid content, such as high-lipid algae.

13. The method of claim 1 wherein the feedstock comprises organic material of an aquatic origin such as fish, fish parts and wastes from fish processing.

14. The method of claim 1 wherein the feedstock comprises materials manufactured or otherwise obtained from biomass, such as paper products and residues rejected as waste streams by paper mills.

15. The method of claim 1 wherein the feedstock comprises organic material of animal origin, such as offal, fats, greases, and tissues.

16. The method of claim 1 wherein the feedstock comprises waste organic material of animal origin, such as manure or sewage sludge.

17. The method of claim 1 wherein the feedstock is introduced to the reactor as a stream comprising solid particles entrained in a rapidly-moving transport gas stream, and wherein the transport of feedstock into the fluidized bed is accomplished primarily via the action of the transport gas on solid particles of feedstock.

18. The method of claim 1 wherein the feedstock comprises a slurry of solid particles, suspended in a carrier liquid that evaporates when it is introduced into the reactor.

19. The method of claim 1 wherein the feedstock comprises an oxygenated organic liquid, which undergoes hydropyrolysis in the hydropyrolysis process.

20. The method of claim 1 wherein a superficial velocity of fluidizing gas passing through the fluidized bed reactor, is sufficient to create a state consistent with that of a bubbling fluidized bed.

21. The method of claim 1 wherein a superficial velocity of fluidizing gas passing through the fluidized bed reactor is no higher than the minimum needed to create a state consistent with that of a bubbling fluidized bed.

22. The method of claim 1 wherein the solid particles of catalyst are spherical.

23. The method of claim 1 wherein the solid particles of catalyst are attrition-resistant.

24. The method of claim 1 wherein the solid particles of catalyst are porous and include a large internal surface area within the outer surface of the particle.

25. The method of claim 1 wherein the solid particles of catalyst have properties consistent with those of a highly active hydrotreating catalyst.

26. The method of claim 1 wherein the solid particles of catalyst comprise an alumina-based substrate, impregnated with a sulfided nickel-molybdenum catalyst or sulfided cobalt-molybdenum catalyst.

27. The method of claim 1 wherein the solid particles of catalyst comprise an alumina-based substrate, impregnated with a metal such as nickel, or cobalt, or iron, or other metals that can be used as catalysts in hydrotreating.

28. The method of claim 1 wherein the solid particles of catalyst comprise an aluminiosilicate-based substrate, impregnated with a metal such as nickel, or cobalt, or iron, or other metals that can be used as catalysts in hydrotreating.

29. The method of claim 1 wherein the solid particles of catalyst comprise a glass-ceramic-based substrate, impregnated with a metal such as nickel, or cobalt, or iron, or other metals that can be used as catalysts in hydrotreating.

30. The method of claim 1 wherein the solid particles of catalyst comprise two or more catalysts which differ by at least one of density, aerodynamic size and aerodynamic diameter but are otherwise physically similar, and are disposed throughout the fluidized bubbling bed and by virtue of having different properties tend to segregate and stratify, becoming vertically ordered by property so as to create regions within the bed that differ in catalytic activity.

31. The method of claim 1 wherein a mean diameter of catalyst particles is greater than approximately 3200 microns (3.2 millimeters).

32. The method of claim 1 further comprising separating metallic catalyst fines from char, the separation effected with a barrier filter that incorporates a remotely energized and de-energized magnetic field to retain magnetic catalyst particles until they can be discharged by backpulsing when the magnetic field is de-energized.

33. The method of claim 32 wherein char can be separated from the product stream and removed by backpulsing while the magnetic field remains energized and magnetic material is retained on the filtering surface.

34. The method of claim 1 further comprising separating metallic catalyst fines from char, wherein the separation is effected by a virtual impactor that diverts a stream of heavier catalyst fines to a downstream collection stage.

35. The method of claim 34 wherein the downstream collection stage is a barrier filter that can be cleaned by periodic backpulsing.

36. The method of claim 34 wherein the downstream collection stage is a barrier filter that incorporates a remotely energized magnetic field to retain magnetic catalyst particles the until they can be discharged when the magnetic field is deenergized and the filter is cleaned by backpulsing.

37. The method of claim 1 wherein slugging in the fluidized bed is controlled via the use of equipment incorporating lateral obstructions, obstacles, or constrictions, an axis or centerline of the equipment intersecting a centerline of the fluidized bed reactor.

38. The method of claim 37 wherein a cross-sectional area of the obstructions, obstacles, or constrictions, when seen from a top of the fluidized-bed reactor, is equal to approximately 40% of the cross-sectional area of the fluidized bed reactor.

39. The method of claim 37 wherein the obstructions, obstacles, or constrictions, are equipped with at least one of temperature-sensing means and means by which heat may be removed from or added to the fluidized bed, in such a manner that the temperature of the fluidized bed around the obstructions, obstacles, or constrictions can be monitored and/or regulated.

40. The method of claim 37 wherein the obstructions, obstacles, or constrictions, are installed at vertical locations along the fluidized bed reactor that are separated from one another by one to two reactor diameters.

41. The method of claim 37 wherein the orientations of the obstructions, obstacles, or constrictions, are varied, when seen from a top of the reactor, so that a single, open passage, running the length of the reactor for a distance of more than two reactor diameters, is not present.

42. The method of claim 37 wherein upper surfaces of the obstructions, obstacles, or constrictions, are at least one of rounded, peaked and sloped in order to prevent bed material from coming to rest on said surface.

43. The method of claim 37 wherein the upper surfaces of the obstructions, obstacles, or constrictions, are porous and constructed so that gas can pass through the upper part of the obstruction in order to prevent bed material from coming to rest on said surface.

44. The method of claim 37 wherein the upper surfaces of the obstructions, obstacles, or constrictions, are uniformly porous and constructed of a highly abrasion-resistant sintered glass ceramic material so that gas can pass through the exterior of the obstruction in order to prevent bed material from coming to rest on said surface.

45. The method of claim 37 wherein the equipment is highly-abrasion resistant.

46. The method of claim 37 wherein the equipment is at least partially constructed of an extremely hard ceramic or glass-ceramic material.

47. The method of claim 37 wherein the equipment is at least partially coated with one of a highly abrasion-resistant coating and an extremely hard ceramic or glass-ceramic material.

48. The method of claim 37 wherein the surfaces of the equipment are catalytically active, and facilitate hydropyrolysis reactions.

49. The method of claim 37 wherein the equipment comprises an insert with a centrally located support, running along the central axis of the fluidized bed reactor, to which the obstructions, obstacles, or constrictions, are attached.

50. The method of claim 37 wherein the equipment comprises an insert with a circumferential support, disposed around the circumference of the fluidized bed reactor, to which the obstructions, obstacles, or constrictions, are attached.

51. The method of claim 37 wherein the equipment comprises an insert with a circumferential support, disposed around the circumference of the fluidized-bed reactor, with gas paths available to connect with locations to where porous obstructions, obstacles, or constrictions are attached.

52. The method of claim 37 wherein the equipment comprises obstructions, obstacles, or constrictions that are directly attached to, supported by, and in communication with the wall of the fluidized bed reactor.

53. The method of claim 37 wherein the equipment comprises obstructions, obstacles, or constrictions that molded or cast into a molded or cast refractory lining of the fluidized bed reactor.

54. The method of claim 1 wherein the modifications that control slugging in the fluidized bed reactor incorporate internal heat-exchanging flow pathways connected to external piping that is isolated from the internal environment of the reactor through which liquids and gases can be passed to extract heat from the reactor.

55. The method of claim 1 wherein all required process heat is supplied from the deoxygenation reactions occurring during hydropyrolysis of the feedstock.

* * * * *